United States Patent
Tock et al.

(10) Patent No.: US 12,141,125 B2
(45) Date of Patent: Nov. 12, 2024

(54) TRANSACTION REORDERING IN BLOCKCHAIN

(71) Applicant: International Business Machines Corporation, Armonk, NY (US)

(72) Inventors: Yoav Tock, Haifa (IL); Hagar Meir, Tel Aviv (IL); Artem Barger, Haifa (IL); Yacov Manevich, Beer Sheva (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 139 days.

(21) Appl. No.: 17/035,912

(22) Filed: Sep. 29, 2020

(65) Prior Publication Data

US 2022/0100733 A1 Mar. 31, 2022

(51) Int. Cl.
| | |
|---|---|
| G06F 16/23 | (2019.01) |
| G06F 16/27 | (2019.01) |
| H04L 9/06 | (2006.01) |
| H04L 9/00 | (2022.01) |

(52) U.S. Cl.
CPC .......... *G06F 16/2379* (2019.01); *G06F 16/27* (2019.01); *H04L 9/0637* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 10,333,694 | B1* | 6/2019 | Hu | G06F 16/1805 |
| 10,365,922 | B1* | 7/2019 | Wang | G06F 21/10 |
| 10,404,473 | B1* | 9/2019 | Hu | H04L 9/3239 |
| 11,100,501 | B1* | 8/2021 | Rainey | H04L 9/0891 |
| 2018/0158034 | A1* | 6/2018 | Hunt | G06Q 20/00 |
| 2019/0019180 | A1* | 1/2019 | Coburn | H04L 9/3247 |
| 2019/0156336 | A1* | 5/2019 | Kasthuri | G06Q 20/3823 |
| 2019/0180266 | A1* | 6/2019 | Sidhu | H04L 63/102 |
| 2019/0182254 | A1* | 6/2019 | Christidis | H04L 9/0637 |
| 2019/0188706 | A1* | 6/2019 | McCurtis | G06Q 20/40 |
| 2019/0199516 | A1* | 6/2019 | Carver | H04L 9/3239 |
| 2019/0303935 | A1* | 10/2019 | Cantrell | G06Q 20/208 |

(Continued)

OTHER PUBLICATIONS

"An apparatus to mitigate contention while providing serializable data isolation by leveraging transactional memory architecture," An IP.com Prior Art Database Technical Disclosure, Authors et al.: Disclosed Anonymously, IP.com No. IPCOM000257884D, IP.com Electronic Publication Date: Mar. 20, 2019, 4 pages.

(Continued)

*Primary Examiner* — Kris E Mackes
*Assistant Examiner* — Cao D Vuong
(74) *Attorney, Agent, or Firm* — Elliot J. Shine

(57) ABSTRACT

A processor may endorse the group of transactions received from one or more clients. The processor may provide a read-set and a write-set for each transaction of the group of transactions. The processor may order the group of transactions at an ordering service. The ordering service may have a group of orderers and may order the group of transactions. The order of the transactions may be based on the read-set and the write-set of each transaction. The processor may commit the group of transactions to the blockchain.

20 Claims, 11 Drawing Sheets

(56) References Cited

U.S. PATENT DOCUMENTS

| | | | | |
|---|---|---|---|---|
| 2020/0128022 | A1* | 4/2020 | Bleikertz | H04L 9/3239 |
| 2020/0266985 | A1* | 8/2020 | Covaci | H04L 9/3236 |
| 2021/0056501 | A1* | 2/2021 | Ravindranathan ... | G06Q 10/083 |
| 2021/0399898 | A1* | 12/2021 | Wright | H04L 9/3073 |

OTHER PUBLICATIONS

"Feedback vertex set", Wikipedia, This page was last edited on Dec. 18, 2019, 5 pages.

"Topological sorting", Wikipedia, This page was last edited on Apr. 24, 2020, 8 pages.

Androulaki et al., "Hyperledger Fabric: A Distributed Operating System for Permissioned Blockchains," EuroSys '18, Apr. 23-26, 2018, Porto, Portugal, doi: 10.1145/3190508.3190538, 15 pages.

Asayag et al., "A Fair Consensus Protocol for Transaction Ordering," in 2018 IEEE 26th International Conference on Network Protocols (ICNP), 2018, pp. 55-65, doi: 10.1109/ICNP.2018.00016.

Bessani et al., "State Machine Replication for the Masses with BFT-SMART," in 2014 44th Annual IEEE/IFIP International Conference on Dependable Systems and Networks, 2014, pp. 355-362, doi: 10.1109/DSN.2014.43.

Castro et al., "Practical Byzantine Fault Tolerance," Appears in the Proceedings of the Third Symposium on Operating Systems Design and Implementation, New Orleans, USA, Feb. 1999, 14 pages.

Chen et al., "A Fixed-Parameter Algorithm for the Directed Feedback Vertex Set Problem," STOC'08, May 17-20, 2008, Victoria, British Columbia, Canada, Copyright 2008 ACM 978-1-60558-047-0/08/05, pp. 177-186.

Even et al., "Approximating Minimum Feedback Sets and Multicuts in Directed Graphs," Algorithmica (1998) 20: 151-174, doi: 10.1007/PL00009191.

Gupta, Suyash, et al., "Scaling Blockchain Databases through Parallel Resilient Consensus Paradigm," arXiv preprint arXiv:1911.00837, 2019, 14 pages.

Mell et al., "The NIST Definition of Cloud Computing", Recommendations of the National Institute of Standards and Technology, NIST Special Publication 800-145, Sep. 2011, 7 pages.

Orda et al.,, "Enforcing Fairness in Blockchain Transaction Ordering," in 2019 IEEE International Conference on Blockchain and Cryptocurrency (ICBC), 2019, pp. 368-375, doi: 10.1109/BLOC.2019.8751349.

Sharma et al., "Blurring the Lines between Blockchains and Database Systems: The Case of Hyperledger Fabric," SIGMOD '19, Jun. 30-Jul. 5, 2019, Amsterdam, Netherlands, pp. 105-122, doi: 10.1145/3299869.3319883.

Skiena, Steven S., The Algorithm Design Manual, Second Edition, Springer-Verlag London Limited, 2008, Chapter 16, Graph Problems: Hard Problems, 118 pages.

Sousa et al., "A Byzantine Fault-Tolerant Ordering Service for the Hyperledger Fabric Blockchain Platform," arXiv:1709.06921v1 [cs.CR] Sep. 20, 2017, 10 pages.

Thakkar et al., "Performance Benchmarking and Optimizing Hyperledger Fabric Blockchain Platform," in 2018 IEEE 26th International Symposium on Modeling, Analysis, and Simulation of Computer and Telecommunication Systems (MASCOTS), 2018, pp. 264-276, doi: 10.1109/MASCOTS.2018.00034.

Tian et al., "Contention-Aware Lock Scheduling for Transactional Databases," Proceedings of the VLDB Endowment, vol. 11, No. 5, Aug. 2018, Rio de Janeiro, Brazil, pp. 648-662, Jan. 2018, doi: 10.1145/3177732.3177740.

* cited by examiner

300

302

| Transaction Order | Read-Set | Write-Set | Is the Transaction Valid? |
|---|---|---|---|
| 1. $T_A$ | $(k_1, ver_1)$ | $(k_2, val, ver_1 \rightarrow ver_2)$ | Yes |
| 2. $T_B$ | $(k_2, ver_1), (k_3, ver_1)$ | $(k_3, val, ver_1 \rightarrow ver_2)$ | No |
| 3. $T_C$ | $(k_2, ver_1), (k_4, ver_1)$ | $(k_4, val, ver_1 \rightarrow ver_2)$ | No |
| 4. $T_D$ | $(k_2, ver_1), (k_4, ver_1)$ | $(k_5, val, ver_1 \rightarrow ver_2)$ | No |

304

| Transaction Order | Read-Set | Write-Set | Is the Transaction Valid? |
|---|---|---|---|
| 1. $T_D$ | $(k_2, ver_1), (k_4, ver_1)$ | $(k_5, val, ver_1 \rightarrow ver_2)$ | Yes |
| 2. $T_B$ | $(k_2, ver_1), (k_3, ver_1)$ | $(k_3, val, ver_1 \rightarrow ver_2)$ | Yes |
| 3. $T_C$ | $(k_2, ver_1), (k_4, ver_1)$ | $(k_4, val\ ver_1 \rightarrow ver_2)$ | Yes |
| 4. $T_A$ | $(k_1, ver_1)$ | $(k_2, val, ver_1 \rightarrow ver_2)$ | Yes |

FIG. 3

TRANSACTION REORDERING IN BLOCKCHAIN

BACKGROUND

The present disclosure relates generally to the field of blockchain storage, and more particularly to minimizing concurrency control issues that can arise in a blockchain network during the flow of transactions.

Concurrency control issues can result in many client submitted transactions being invalidated during validation commit phases where peers commit the transactions to the blockchain. A record of invalidated transactions can often be maintained in the blockchain. Recording/committing invalidated transaction to the blockchain can result in dead storage space and blockchain performance degradation. When transactions submitted to the blockchain are repeatedly rejected, trust in the blockchain can be diminished. As such, a method for increasing the number of valid transactions while safeguarding against potential biases is needed.

SUMMARY

Embodiments of the present disclosure include a method, system, and computer program product to order a group of transactions, based on read-set and write-set of each transaction of the group of transactions. A processor may endorse the group of transactions received from one or more clients. The processor may provide a read-set and a write-set for each transaction of the group of transactions. The processor may order the group of transactions at an ordering service. The ordering service may have a group of orderers and may order the group of transactions. The processor may order of the transactions based on the read-set and the write-set of each transaction. The processor may commit the group of transactions to the blockchain.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

FIG. 3 depicts a block diagram depicting an example of ordering transactions received at an ordering service, in accordance with embodiments of the present disclosure.

Figure 1A:
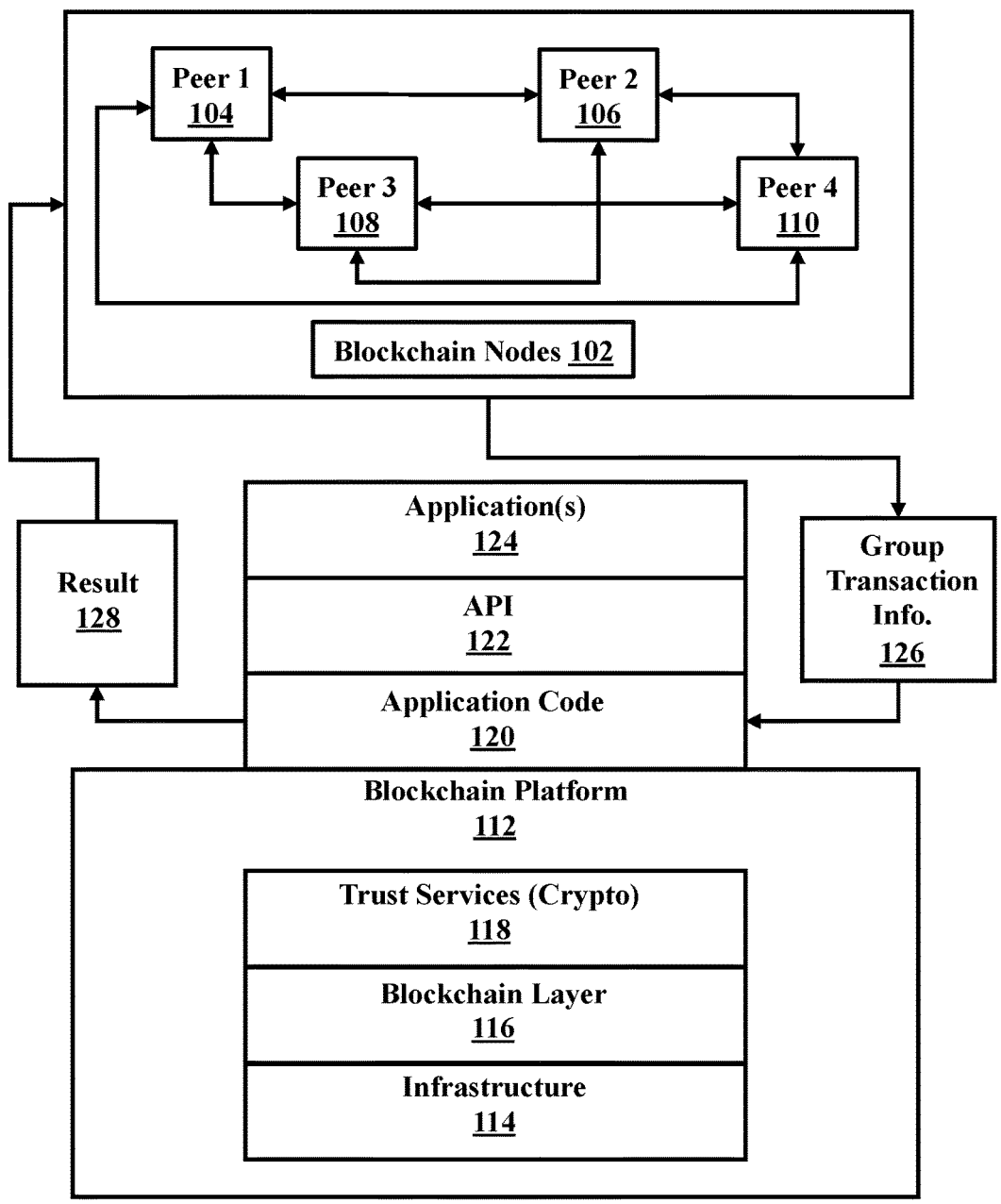
FIG. 1A illustrates an example blockchain architecture, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of reducing concurrency control issues in blockchain networks, and more specifically to configuring the ordering services of the blockchain to reduce multi-version concurrency control issues (e.g., MVCC violations) while maintaining peer trust. While blockchain networks prevent these inconsistencies from being applied to the ledger and incorrectly updating the current state, state inconsistencies can arise during the inherent latency between a transaction's endorsement and commitment phases. Due to this delay in time between when an endorser generates a transaction's read-set and write-set and when the same transaction (e.g., a valid transaction) is committed to the blockchain can, in the meantime, result in several other transactions having conflicting read-sets generated during endorsement. As a result of this latency, many transactions can be invalidated. Embodiments described herein address blockchain concerns in regard to the impact of concurrency control issues that can be a major cause of performance degradation and resource waste. While attempts have been made to reduce performance degrading concurrency control issues, such as configuring ordering services to have a leader orderer that determines a transaction order that is then broadcast to peers by follower orderers (e.g., crash fault tolerance schemes), these attempts often do not consider orderer trustworthiness. In these configurations, malicious and/or censorship behaviors may affect the integrity and diminish trust in the blockchain network.

It will be readily understood that the instant components, as generally described and illustrated in the figures herein, may be arranged and designed in a wide variety of different configurations. Accordingly, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Detailed herein is a method, system, and computer program product that utilize transaction reordering to minimize performance degradation and resource waste caused as a result of concurrency control issues that can arise in the flow of transactions in a blockchain network (e.g., Hyperledger Fabric).

In some embodiments, the method, system, and/or computer program product utilize a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency.

In various embodiments, a permissioned and/or a permission-less blockchain can be used. In a public or permission-less blockchain, anyone can participate without a specific identity (e.g., retaining anonymity). Public blockchains can involve native cryptocurrency and use consensus based on various protocols such as Proof of Work. On the other hand, a permissioned blockchain database provides secure interactions among a group of entities which share a common goal, but which do not fully trust one another, such as businesses that exchange funds, goods, (private) information, and the like.

Further, in some embodiments, the method, system, and/or computer program product can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The method, system, and/or computer program product can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded.

An endorsement policy allows chaincode to specify endorsers for a transaction in the form of a set of peer nodes that are necessary for endorsement. When a client sends the transaction to the peers specified in the endorsement policy, the transaction is executed by the peers, which generate speculative transaction results. If enough peers to satisfy the endorsement policy produce identical execution results, the transaction is considered endorsed. After endorsement, the transactions enter an ordering phase in which a consensus protocol is used to produce an ordered sequence of endorsed transactions grouped into blocks. Traditionally used consensus protocols include first-in first-out (FIFO), and leader and follower protocols (e.g., Crash fault tolerance protocols).

In some embodiments, the method, system, and/or computer program product can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., orderer node).

Another type of node is a peer node which can receive ordered client submitted transactions (e.g., from ordering service), commit the transactions and maintain a state and a copy of the ledger of blockchain transactions. Peers can also have the role of an endorser, although it is not a requirement. An ordering-service-node or orderer is a node running an ordering service, which receives a stream of endorsed transactions from clients and emits a stream of ordered transactions. An ordering service node runs a communication service for all peer nodes, and implements a delivery guarantee, such as a broadcast to each of the peer nodes in the system when committing/confirming transactions and modifying a world state of the blockchain, which is another name for the initial blockchain transaction which normally includes control and setup information.

In some embodiment, the method, system, and/or computer program product can utilize a ledger that is a sequenced, tamper-resistant record of all state transitions of a blockchain. State transitions may result from chaincode invocations (e.g., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

In some embodiment, the method, system, and/or computer program product described herein can utilize a chain that is a transaction log that is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (e.g., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include a method, system, and computer program product for increasing the number of valid transactions and minimizing the number of potential concurrency control issues, by reordering the transactions at the ordering service. The exemplary embodiments described herein not only solve a major cause of performance degradation and resource waste, but also aid in increasing trust in the blockchain network among clients and peers. The blockchain networks may be homogenous based on the asset type and rules that govern the assets based on the smart contracts.

Blockchain is different from a traditional database in that blockchain is not a central storage, but rather a decentralized, immutable, and secure storage, where nodes may share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the system described herein is implemented due to immutable accountability, security, privacy, permitted decentralization, availability of smart contracts, endorsements and accessibility that are inherent and unique to blockchain.

In particular, the blockchain ledger data is immutable and that provides for an efficient method for identifying discrepancies in a blockchain network. Also, use of the encryption in the blockchain provides security and builds trust. The smart contract manages the state of the asset to complete the life-cycle. The example blockchains are permission decentralized. Thus, each end user may have its own ledger copy to access. Multiple organizations (and peers) may be on-boarded on the blockchain network. The key organizations may serve as endorsing peers to validate the smart contract execution results, read-set and write-set. In other words, the blockchain inherent features provide for efficient implementation of processing a private transaction in a blockchain network.

One of the benefits of the example embodiments is that it improves the functionality of a computing system by implementing a method for processing a private transaction in a blockchain network. Through the blockchain system described herein, computing system (or a processor in the computing system) can perform functionality for the reordering of transactions received from one or more client applications utilizing blockchain networks by providing access to capabilities such as distributed ledger, peers, encryption technologies, MSP, event handling, etc. Also, the blockchain enables to create a business network and make any users or organizations to on-board for participation. As such, the blockchain is not just a database. The blockchain comes with capabilities to create a network of users and on-board/off-board organizations to collaborate and execute service processes in the form of smart contracts (which may be associated with one or more assets).

The example embodiments provide numerous benefits over a traditional database. For example, through the blockchain the embodiments provide for immutable accountability, security, privacy, permitted decentralization, availability of smart contracts, endorsements and accessibility that are inherent and unique to the blockchain.

A traditional database could not be used to implement the example embodiments because it does not bring all parties on the network, it does not create trusted collaboration, and does not provide for an efficient storage of digital assets. The traditional database does not provide for a tamper proof storage and does not provide for preservation of the digital assets being stored. As a result, the proposed embodiments described herein utilizing blockchain networks cannot be implemented in the traditional database.

If a traditional database were to be used to implement the example embodiments, the example embodiments would have suffered from unnecessary drawbacks such as search capability, lack of security and slow speed of transactions. Accordingly, the example embodiments provide for a specific solution to a problem in the arts/field of transaction reordering to minimize state violations within the blockchain.

The example embodiments also change how data may be transferred within a blockchain network or between blockchain networks. For example, the disclosure presented herein ensures that an ordering service can reorder transactions received from one or more client application by identifying an order among the transactions that minimizes concurrency control violations (e.g., MVCC violations) prior to being committed to the blockchain while also maintaining client trust. Reordering transactions at the ordering service can prevent client submitted transactions from being invalidated due concurrency control issues/violations and forcing the clients to resubmit the process. Reducing the number of concurrency control issues at the ordering service, prior to committing the block, results in an increase in transmission, processing and crypto-validation of transactions while minimizing dead storage space and delays for clients who must wait for a block to commit before being notified of an invalid transaction.

Turning now to FIG. 1A, illustrated is a blockchain architecture 100, in accordance with embodiments of the present disclosure. In some embodiments, the blockchain architecture 100 may include certain blockchain elements, for example, a group of blockchain nodes 102. The blockchain nodes 102 may include one or more blockchain nodes, e.g., peers 104-110 (these four nodes are depicted by example only). These nodes participate in a number of activities, such as a blockchain transaction addition and validation process (consensus). One or more of the peers 104-110 may endorse and/or recommend transactions based on an endorsement policy and may provide an ordering service for all blockchain nodes 102 in the blockchain architecture 100. A blockchain node may initiate a blockchain authentication and seek to write to a blockchain immutable ledger stored in blockchain layer 116, a copy of which may also be stored on the underpinning physical infrastructure 114. The blockchain configuration may include one or more applications 124 which are linked to application programming interfaces (APIs) 122 to access and execute stored program/application code 120 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 104-110.

The blockchain base or platform 112 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 116 may expose an interface that provides access to the virtual execution environment necessary to process the program code and engage the physical infrastructure 114. Cryptographic trust services 118 may be used to verify transactions such as asset exchange transactions and keep information private.

The blockchain architecture 100 of FIG. 1A may process and execute program/application code 120 via one or more interfaces exposed, and services provided, by blockchain platform 112. The code 120 may control blockchain assets. For example, the code 120 can store and transfer data, and may be executed by peers 104-110 in the form of a smart contract and associated chaincode with conditions or other code elements subject to its execution. As a non-limiting example, smart contracts may be created to execute the transfer of resources, the generation of resources, etc. The smart contracts can themselves be used to identify rules associated with authorization and access requirements and usage of the ledger. For example, the group transaction information 126 may be processed by one or more processing entities (e.g., virtual machines) included in the blockchain layer 116. The result 128 may include a plurality of linked shared documents (e.g., with each linked shared document recording the issuance of a smart contract in regard to the group transaction information 126, etc.). The physical infrastructure 114 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details (e.g., thus confirming the group of transactions, identifying a conflict between one or more of the transactions in the group of transactions, etc.).

Figure 1B:
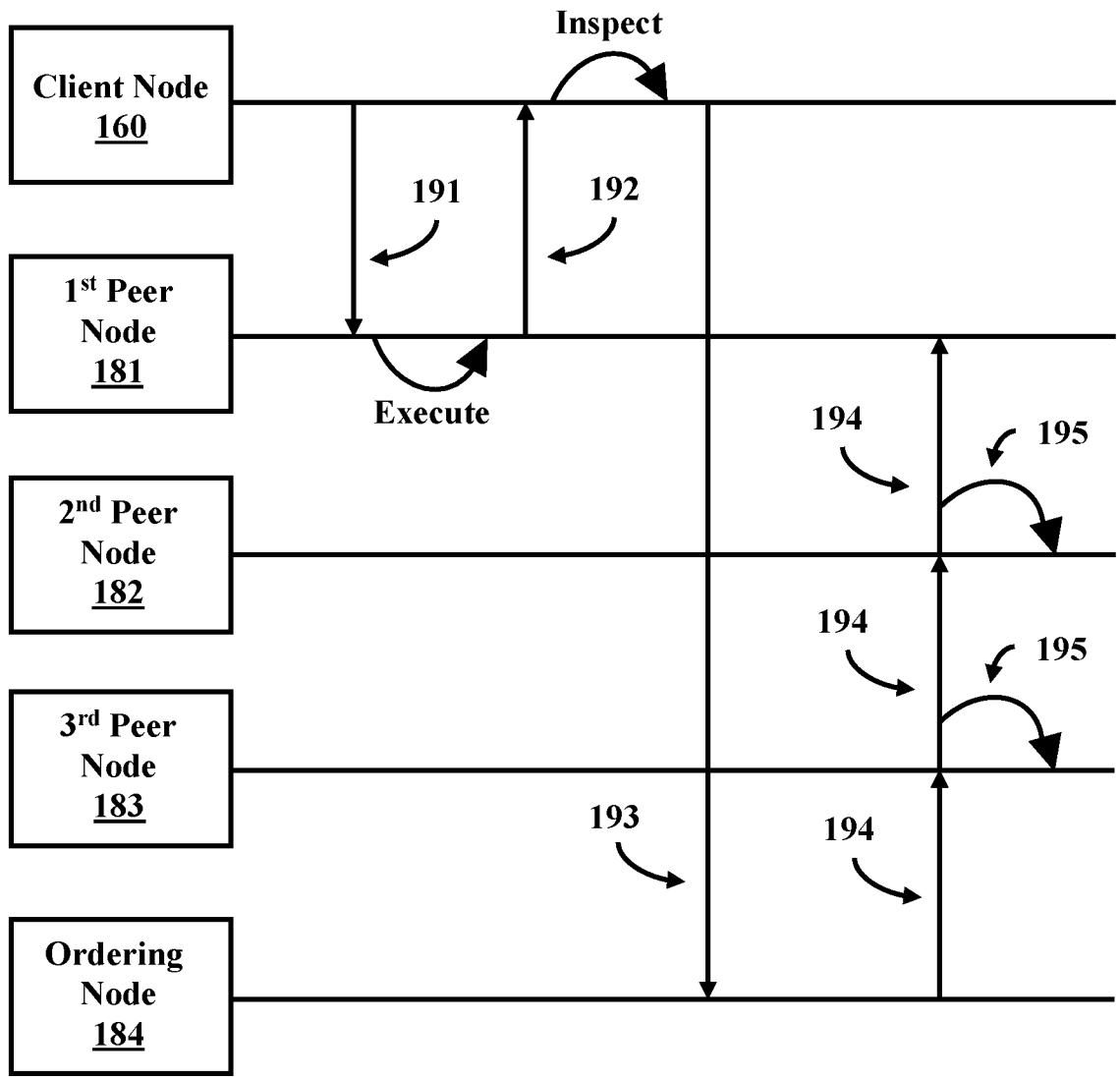
FIG. 1B illustrates a blockchain transactional flow, in accordance with embodiments of the present disclosure.

FIG. 1B illustrates an example of a conventional blockchain transactional flow 150 between nodes of the blockchain in accordance with an example embodiment. Referring to FIG. 1B, the transaction flow may include a transaction proposal 191 sent by an application client node 160 to one or more endorsing peer nodes 181 (e.g., in some embodiments, the transaction proposal 191 may be a transaction verification request and/or a conflict verification request). The endorsing peer 181 may verify the client signature and execute a chaincode function to initiate the transaction. The output may include the chaincode results, a set of key/value versions that were read in the chaincode (read set), and the set of keys/values that were written in chaincode (write set). The proposal response 192 is sent back to the client 160 along with an endorsement signature, if approved. The client 160 assembles the endorsements into a transaction payload 193 and broadcasts it to an ordering service node 184. The ordering service node 184 then delivers ordered transactions as blocks to all peers 181-183 on a channel. Before committal to the blockchain, each peer 181-183 may validate the transaction. For example, the peers may check the endorsement policy to ensure that the correct allotment of the specified peers have signed the results and authenticated the signatures against the transaction payload 193.

Referring again to FIG. 1B, the client node 160 initiates the transaction 191 by constructing and sending a request to the peer node 181, which is an endorser. The client 160 may include an application leveraging a supported software development kit (SDK), which utilizes an available API to generate a transaction proposal 191. The proposal is a request to invoke a chaincode function so that data can be read and/or written to the ledger (e.g., write new key value pairs for the assets). The SDK may reduce the package of the transaction proposal 191 into a properly architected format (e.g., protocol buffer over a remote procedure call (RPC)) and take the client's cryptographic credentials to produce a unique signature for the transaction proposal 191.

In response, the endorsing peer node 181 may verify (a) that the transaction proposal 191 is well formed, (b) the transaction has not been submitted already in the past (replay-attack protection), (c) the signature is valid, and (d) that the submitter (client 160, in the example) is properly authorized to perform the proposed operation on that channel. The endorsing peer node 181 may take the transaction proposal 191 inputs as arguments to the invoked chaincode function. The chaincode is then executed against a current state database to produce transaction results including a response value, read-set, and write-set. However, no updates are made to the ledger at this point. In some embodiments, the set of values, along with the endorsing peer node's 181 signature is passed back as a proposal response 192 to the SDK of the client 160 which parses the payload for the application to consume.

In response, the application of the client 160 inspects/ verifies the endorsing peers' signatures and compares the proposal responses to determine if the proposal response is the same. If the chaincode only queried the ledger, the application would inspect the query response and would typically not submit the transaction to the ordering node service 184. If the client application intends to submit the transaction to the ordering node service 184 to update the ledger, the application determines if the specified endorsement policy has been fulfilled before submitting (e.g., has a transaction verification request been accepted). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 193 the client 160 assembles endorsements into a transaction and broadcasts the transaction proposal 191 and response within a transaction message to the ordering node 184. The transaction may contain the read/write sets, the endorsing peers' signatures and a channel ID. The ordering node 184 does not need to inspect the entire content of a transaction in order to perform its operation, instead the ordering node 184 may simply receive transactions from all channels in the network, order them by channel, and create blocks of transactions per channel.

The blocks of the transaction are delivered from the ordering node 184 to all peer nodes 181-183 on the channel. The transactions 194 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 195 each peer node 181-183 appends the block to the channel's chain, and for each valid transaction the write sets are committed to current state database. An event is emitted, to notify the client application that the transaction (invocation) has been immutably appended to the chain, as well as to notify whether the transaction was validated or invalidated. Validated transaction and their associated values update the blockchain ledger, while invalidated transactions are committed but the invalidated transaction values do not update the blockchain ledger.

While the transaction flow referenced in FIG. 1B ensures that the blockchain ledger is consistent and immutable for each peer, often many transactions within a block of transactions are determined to be invalid by peers during the commit validation phase. The block, having both valid and invalid transactions, is then appended to each peer's local ledger and applies all changes made by valid transactions to the peer's current state database. While committing invalid transactions in a block is important for maintaining a complete and clear record, these transactions not only result in dead storage space, but can also result in significant resource waste. In these situations, clients are often not provided notice that a submitted transaction is invalid until the block of transactions is committed to the blockchain. As a result, the resources used to push the transaction from the execution phase to the validation phase as well as resources consumed when a client must resubmit the transaction, are wasted. In addition, clients often do not receive any guidance on why transactions are identified as invalid. In situations where a client's transactions are repeatedly invalidated without evidence, can cause a client's trust in the blockchain network to diminish. Reducing the number of invalid transactions can not only improve performance and reduce resource waste within the blockchain network, but also ensure client trust is maintained.

Many of the invalid transactions discussed above are determined to be invalid based on concurrency control issues (e.g., MVCC violations). Traditional concurrency issues arise in database systems when a read operation occurs on a dataset at the same time a write operation is performed on the same dataset. In these situations, it is possible that the read operation will read wrong or inconsistent data from the data set. While blockchain networks prevent these inconsistencies from being applied to the ledger and incorrectly updating the current state, state inconsistencies can arise during the inherent latency between a transaction's endorsement and commitment phases. More particularly, due to the delay in time between when an endorser (endorsing peer) generates a transaction's read-set and write-set and when the same transaction (e.g., a valid transaction) is committed to the blockchain can, in the meantime, result in several other transactions having conflicting read-sets generated during endorsement.

In addition, as discussed herein, in order to have a transaction committed to the blockchain a client submits a transaction proposal to endorsers. Each endorser simulates the transaction proposal against their local current state to produce a read-set and write-set without making changes to the current state. While blockchain networks ensure all peers receive blocks to be committed to the blockchain in the same order, not every peer is guaranteed to receive the blocks at the same time. As such, additional concurrency control issues can result when an endorsing peer has not committed all of the blocks sent by the ordering service.

Each endorsing peer's local current state is a versioned key-value store in the form of (key, value, version) and contains the most recently committed value and version for each unique key associated with the ledger. Each successive valid transaction committed in block form to the blockchain can result in a version change making the version number unique to the transaction. While the minimal requirement for a version number is a scheme that produces nonrepeating identifiers for each unique key, any versioning scheme can be used. For example, the version numbering system can be configured to use monotonically increasing numbers after each successive update or, alternatively, can be based on the height of the committing transaction on the blockchain can be used as the latest version for all the keys modified by the transaction.

The read-set produced by the endorser includes at least a list of unique keys and a committed version (e.g., (key, version)) that the transaction reads from the current state during simulation. The write-set produced by the endorser includes at least a list of unique keys and their new values (e.g., (key, value)) that the transaction writes. While in some embodiments, one or more of the keys listed in the read-set are the same as those listed in the write-set, in other embodiments, none of the keys listed in the read-set and write-set are the same. In many of the example embodiments discussed herein, reference is made to transactions having one or two keys, this is only for the sake of simplicity and transaction's read-sets and write-sets can include any number of keys.

In general, while the endorsers produce the read-set and write-set, no updates are made to the endorser's local current state. Allowing endorsers to update their local current states based on the results of these simulations can result in bypassing a multitude of checks and balances and potentially compromising the validity of the ledger. In various blockchain networks, like those disclosed herein, endorsers can receive transaction proposals from numerous clients and simulate transaction proposals in parallel. As such, endorsers do not take into consideration a previously simulated transaction that has not already been committed to the blockchain (e.g., committed valid transactions are represented in the current state) during simulation and when generating transaction read-sets and write-sets. Because of this, endorsers do not provide or consider the order of simulated transactions during endorsement.

Once an endorser has completed the transaction simulation, a proposal response of the transaction with the read-set and write-set can be sent to the client in a message called an endorsement. The client may continue collecting endorsements from individual endorsers until an endorsement policy, as determined by the network, is satisfied. After the endorsement policy has been satisfied, the client can create the transaction and send it to the ordering service (see FIG. 2).

Known ordering service configurations, such as first-in first-out (FIFO), and leader and follower protocols (e.g., crash fault tolerance, (CFT)) have been known to either result in significant concurrency issues or reduce trust within the blockchain network. Trust is particularly fragile when dealing with leader and follower models. In leader and follower models, a leader node is elected from a cluster of orderers (e.g., followers). The leader node receives the transactions for the ordering service, then cuts a block containing the transactions and then sends the block to the other orderers (e.g., followers) of the cluster to be broadcast to the other peers. These configurations aim to ensure that the ordering service can perform as intended even if one or more orderers crashed or fail. In these order service configurations, little concern is given to whether the leader node is trustworthy because the concern is on the orderers crashing and not on trustworthiness, the other orderers (e.g., followers) and the peers do not question the transaction order proposed by the leader node. Such ordering service configurations can allow malicious or dishonest behavior (e.g., censorship) to occur within the blockchain. As such, there is a need for an ordering service that can minimize the number of invalid transactions, caused by concurrency control issues, while also ensuring and maintaining trust in the blockchain network.

Figure 2:
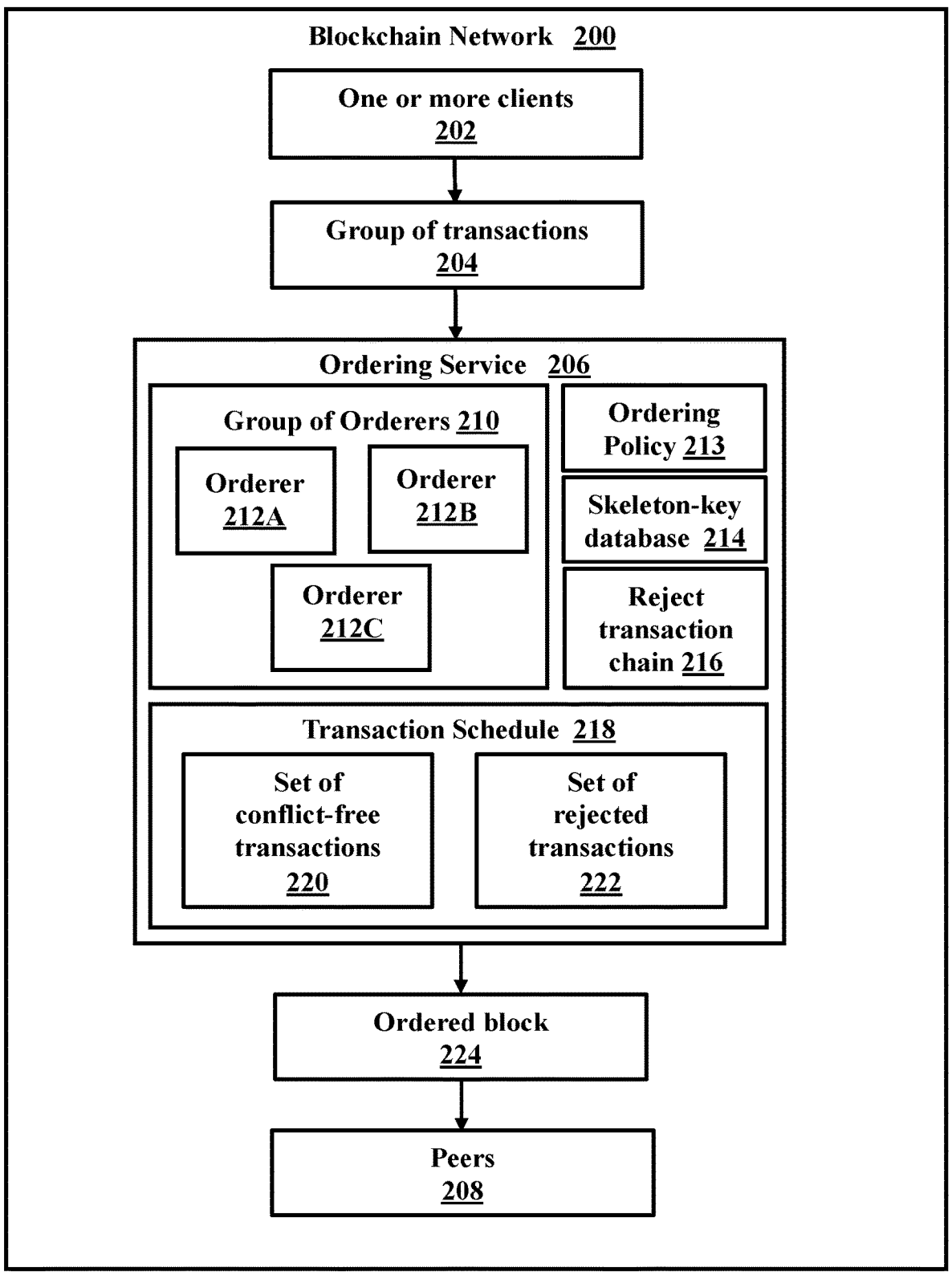
FIG. 2 illustrates an example blockchain network ordering transactions at an ordering service, in accordance with embodiments of the present disclosure.

Turning to FIG. 2, illustrated is an example blockchain network 200 for reordering a group of transactions 204 received from one or more clients 202 at ordering service 206, in accordance with embodiments of the present disclosure. While the exemplary embodiments disclosed herein sometimes refer to a single transaction, embodiments of the present disclosure can be configured to implement any number of transactions. In embodiments, at least all, or less than all, of the same or similar features/structures associated and disclosed in reference to FIGS. 1A and 1B can be included in FIG. 2. In some embodiments, the blockchain network 200 is a Hyperledger Fabric blockchain network allowing one or more clients 202 to interact with blockchain network 200 that can be maintained by ordering service 206 and by peers 208. While FIG. 2 depicts peers 208 as one block, peers 208 can include any number of peers configured among one or more organizations belonging to blockchain network 200.

In embodiments, ordering service 206 can include a group of orderers 210 having orderers 212A-C, ordering policy 213, skeleton-key database 214, rejected transaction chain 216, and transaction schedule 218. Ordering service 206 can be configured to receive a group of transactions 204 from one or more clients 202. Transactions included in group of transactions 204 can be all be sent from one client, can each be sent from different clients, or, one or more transactions included in group of transactions 204 can be sent by one client while the other transactions can be sent from different clients. While in many embodiments, reference is made to ordering service 206 being configured to perform transaction ordering and various other functions, group of orderers 210 and/or each orderer 212A-C can each be collectively or independently configured to perform any function or analysis referenced herein to be performed by ordering service 206.

In embodiments, one or more clients 202 have received group of transactions 204 back from the endorsers (not shown in FIG. 2). As such, each transaction of group of transactions 202 has been simulated by endorsers and received a corresponding read-set and a write-set generated during endorsement. After endorsement, one or more clients 202 can send group of transactions 204 to ordering service 206.

Often, transactions included in group of transactions 204 can arrive at ordering service 206 in any order, with no consideration given to potential concurrency control issues. In embodiments, ordering service 206 can be configured to order (e.g., reorder) group of transactions 204 to form transaction schedule 218, based at least in part on each transaction's read-set and write-set. The order of transactions in transaction schedule 218 not only minimizes the number of concurrency control issues within a block of transactions (e.g., ordered block 224), but can also reduce those concurrency control issues that might arise between a block of transactions and blocks of transactions previously committed to the blockchain by peers 208.

In some embodiments, transaction schedule 218 includes at least conflict-free transaction set 220, but in other embodiments, transaction schedule 218 can also include rejected transaction set 222. Conflict-free transaction set 220 can include any number of transactions from group of transactions 204 ordered based, at least in part, on the read-set and write-set of each transaction. In embodiments, conflict-free transaction set 220 only includes transactions determined by the ordering service to be valid transactions. Rejected transaction set 222 can include any number of transactions from the group of transactions 204 that have been rejected (e.g., removed, invalidated, stale, etc.) from conflict-free transaction set 220 for one or more reasons, such as concurrency control issues (See discussion for FIGS. 3, 4A, and 4B for more detail). While in some embodiments rejected transaction set 222 includes an order (e.g., based on arrival order), in other embodiments rejected transaction set 222 includes a list of one or more transactions that has been rejected and can be found in any order. In embodiments where no transactions have been rejected, rejected transaction set 222 can include a null character or null indicator that indicates that all transactions of group of transactions 204 were considered, but no transaction was rejected. While ordering service 206 can specifically determine the order of conflict-free transaction set 220 and rejected transaction set 222, such methods and analyses are discussed in more detail in reference to FIGS. 3-6.

As discussed generally herein, because of the distributed nature of blockchain networks (e.g., blockchain network 200) trust in the blockchain network is critical. In some situations, if a client (e.g., one or more clients 202) continues to try to interact with the blockchain by submitting transactions that are repeatedly determined to be invalid during the validate commit phase, the client can become distrustful of the blockchain network. Because traditional systems can have a significant portion of their client submitted transactions determined invalid, providing an impartial ordering service that can reduce invalid transactions while remaining unbiased is paramount.

In embodiments, ordering service 204 can have group of orderers 210. While FIG. 2 depicts group of orderers 210 having three orderers 212A-C, group of orderers 210 can have any number of orders as designated by blockchain network 200 and/or ordering policy 213. Ordering service 206, groups of orders 210 and their behavior can be governed by ordering policy 213 configured by blockchain network 200. Each orderer 212A-C of group of orderers 210 can, in some embodiments, work collaboratively to determine transaction schedule 218. In other embodiments, each orderer 212A-C can receive group of transactions 204 and independently process transaction schedule 218 based, at least in part, on the read-set and write-set of each transaction from group of transactions 204. In these embodiments, once each orderer 212A-C independently determines transaction schedule 218 from group of transactions 204, each orderer 212A-C can compare their respective transaction schedules 218 to the other orderers in group of orderers 210 and determine if there is consensus among group of orderers 210. A consensus can be reached when a predetermined portion of orderers 212A-C of group of orderers 210 agree on transaction schedule 218. In some embodiments, the predetermined portion of orderers 212A-C may be determined by a controlling entity of a private blockchain or provided in the world state of a blockchain (e.g., a public blockchain associated with cryptocurrency may want 75% of the orderers 212A-C agreeing on a transaction schedule so as to avoid an unnecessary rejection of the group of transactions 204 and thus delaying the processing of the cryptocurrency to a user, etc.).

In embodiments, each orderer 212A-C can compare their independently processed transaction schedule 218 by considering if the conflict-free transaction set 220 of each transaction schedule 218 is similarly ordered (e.g., in an identical order, within threshold order limit [one transaction off from one another, etc.], etc.). In some embodiments, in addition to comparing and considering whether conflict-free transaction set 220 is similarly ordered, each orderer 212A-C can also compare rejected transaction set 222. In these embodiments, orderers can compare the order of rejected transaction set 222 or can compare and confirm that the same transactions occur in each of the independently processed rejected transaction set 222, regardless of order.

In embodiments, ordering policy 213 can dictate how a consensus can be reached among group of orderers 210. In some embodiments, ordering policy 213 can dictate what sorting principles and/or methods can be used by orderers 210 when determining transaction schedule 218. For example, by dictating that orderers 212A-C must use the same sorting principles and/or methods (e.g., directed acyclic graph (DAG), feedback vertex set, vertex cover methods) can increase the chances that a consensus can be reached among group of orderers 210. Ordering policy 213 can also define when a consensus is met and the number or predetermined portion of group of orderers 210 that must agree on transaction schedule 218. In addition, ordering policy 213 can define if transaction schedule 218 should only include conflict-free transaction set 220, if transaction schedule 218 should include both conflict-free transaction set 220 and rejected transaction set 222, and/or if rejected transaction set 222 should be ordered or not.

In embodiments where a consensus among orderers 212A-C of group of orderers 210 is used to determine transaction schedule 218, a single orderer 212A-C or a small portion of orderers from group of orderers 210 (e.g., leader node orderer) are prevented from having a disproportionate and potentially biased input on the order or validity of transactions in transaction schedule 218. In these embodiments, each orderer 212A-C of group of orderers 210 can receive group of transactions 204, can have guidelines regarding sorting methods and principles (e.g., ordering policy 213), and then each orderer 212A-C can independently process group of transactions 204 to determine transactions schedule 218.

In embodiments, if a predetermined portion of orderers 212A-C of group of orderers 210 agree on the transaction schedule 218 (e.g., reach a consensus), then each orderer 212A-C can receive notification of the agreed upon transaction schedule 218. In embodiments, ordering service 206 can be configured to have a Byzantine fault tolerance (BFT) environment. In embodiments where ordering service 206 has a BFT environment, ordering service 206 is configured to still be able to function as intended when a portion of orderers 212A-C of group of orders 210 fail. While failure can account for orderer 212A-C crashing or failing to determine the transaction schedule 218, failure can also refer to an orderer acting in a malicious or dishonest manner (e.g., supplying a transaction schedule that censors a client's submitted transaction). The level of failure ordering service 206 can tolerate in a BFT environment can be defined by the number or predetermined portion of orderers 212A-C from group of orderers 210 who need to agree on conflict-free transaction set 220 and/or reject transaction set 222 to establish a consensus. In some embodiments, the BFT environment and failure tolerance or fault tolerance can be configured by ordering policy 213. In some embodiments, a consensus can be reached among group of orderers 210 with a simple majority. In this embodiment, ⅔ of the group of orderers 210 plus 1 orderer would be required to agree on the order of transaction schedule 218, while the remaining orderers could fail and/or be malicious and ordering service 206 would still be able to order group of transactions 204 in such a way that minimized the number of concurrency control issues and remain trustworthy. While ⅔ orderers 212A-C from group of orderers 210, or a BFT environment configured ordering service 206, is discussed herein, any other consensus paradigm can be used (e.g., simple majority to avoid crashes at the ordering service crash).

In embodiments where a predetermined portion of orderers 212A-C of group of orderers 210 agree on an independently processed transaction schedule 218 (e.g., have reached a consensus), the agreed upon transaction schedule 218 can reduce the number of concurrency control issues and can produce a trustworthy and unbiased conflict-free transaction set 220 and rejected transaction set 222. In some embodiments, the conflict-free transaction set 220 and the rejected transaction set 222 determined in transaction schedule 218 can be cut into ordered block 224. In these embodiments, conflict-free transaction set 220 can be ordered before the rejected transaction set 222 in ordered block 224 to ensure each ordered transaction in the conflict-free transaction set 220 and each transaction's respective write-set can be properly reflected in the current state after ordered block 224 is committed to the blockchain by peers 208. In this embodiment, while each transaction in rejected transaction set 222 can be determined to be invalid, invalid transactions are still committed to the blockchain to maintain a record, but invalid transactions (e.g., rejected transaction set 222) and their respective write-sets do not update the current state when committed to the blockchain by peers 208.

In embodiments where transaction schedule 218, having conflict-free transaction set 220 and rejected transaction set 222, has been processed by ordering node 206 (e.g., by reaching a consensus among group of orderers 210), additional considerations can increase trust within the blockchain and reduce dead-space associated with committing rejected transaction set 222, having invalid transaction, to the blockchain. In some embodiments, ordering service 206 can organize the transactions identified in rejected transaction set 222 into a Merkle-tree. The Merkle tree of the transaction identified in reject transaction set 222 can be further organized into a Merkle-root. In embodiments, ordering service 206 can include conflict-free transaction set 220 of transaction schedule 218 and the Merkle-root of rejected transaction set 222 in a valid transaction block (e.g., cut ordered block 224). In these embodiments, ordering service can send each orderer 212A-C of group of orderers 210 a copy of the valid transaction block. Each orderer 212A-C can then broadcast the valid transaction block of ordered transactions (e.g., conflict-free transaction set 220) and Merkel-root of rejected transactions (e.g., rejected transaction set 222) to peers 208. The valid transaction block can then be committed to the blockchain and the valid transactions can be reflected and updates in the current state of the blockchain ledger. Due to the ordering principles discussed in more detail in reference to FIGS. 3-6 each transaction can be ordered in such a way as to minimize or eliminate the number of concurrency control issues that might otherwise cause a transaction to be identified as invalid.

In some embodiments, ordering service 206 can also block the Merkle-tree of rejected transaction set 222 and the block number associated with the valid transaction block (e.g. ordered block 224) into a rejected transaction block. While some embodiments of the rejected transaction block include the Merkle-tree of rejected transaction set 222 and the block number associated with the valid transaction block, in other embodiments, the rejected transaction block can have the original rejected transaction set 222 (e.g., not organized into a Merkle-tree or Merkle-root). In embodiments, ordering service 206 can maintain reject transaction chain 216.

In some embodiments, each orderer 212A-C has a local copy of reject transaction chain 216, while in other embodiments, ordering service 206 maintains only one reject transaction chain 216. Reject transaction chain 216 can include any chain of rejected transaction blocks, wherein each block represents a record of each iteration of rejected transaction set 222 at ordering service 206 and an indicator referring to the valid transaction block where the conflict-free transaction set 220 (e.g., conflict-free transaction set 220 from the same ordering iteration as rejected transaction set 222), is blocked. In embodiments where a client (e.g., one or more clients 202) or other actors within blockchain network 200 desires to inspect a rejected transaction or rejected transaction block stored in reject transaction chain 214, an API can be exposed and used to fetch the particular rejected transaction block and/or the particular transaction that was previously rejected. In embodiments, whether accessing the rejected transaction block or the valid transaction block, each block contains linking information that can be used to find the corresponding rejected transaction set 222 or conflict-free transaction set 220.

As discussed herein, in traditional blockchain networks, clients often are not notified that a submitted transaction has been invalidated until the submitted transaction is in the validate commit phase performed by peers. In embodiments, ordering service 206 can determine a particular transaction or transactions of group of transactions 204 is part of rejected transaction set 222 based, at least in part, on each transactions read-set and write-set. A particular transaction can be determined to be part of rejected transactions set 222 for a variety of reasons (e.g., invalidated, removed, etc.). These reasons are discussed in more detail in FIGS. 3-6, but are presently omitted for brevity.

In embodiments where ordering service 206 determines a particular transaction is part of the rejected transaction set 222, ordering service 206 can provide each of the one or more clients 202 associated with the particular transaction or transactions (e.g., the client who submitted the particular transaction) a rejection message. A rejection message can provide the one or more clients 202 associated with the particular transaction or transactions with evidence regarding why that particular transaction was rejected. In some embodiments, the rejection message can also include a transaction's identification, the valid transaction block number, the rejected transaction block number, a hash of either the new valid transaction block or the new rejected transaction block, or a combination thereof.

Providing one or more clients 202 with a rejection message that provides evidence and/or a rationale regarding why the transaction was rejected not only aids in maintaining client trust by proving to the one or more clients 202 that the particular transaction was rejected for logical reasons and not as a result of malicious or biased behavior. In addition, one or more clients 202 can receive the rejection message while ordering service 206 orders group of transactions 204 instead of waiting for the traditional validate commit phase. As a result, one or more clients 202 can receive notice that their submitted transaction (e.g., the particular transaction) is rejected and do not have to wait till the same transaction is committed to the blockchain to receive notice the transaction failed (e.g., was rejected). In these embodiments, one or more clients 202 can receive the rejection message regarding a particular transaction or transactions and resubmit the transaction in a more efficient and timely manner.

In some embodiments, one or more orderers 212A-C from the group of orderers 210 can each independently determine a particular transaction or transactions are rejected. In these embodiments, each orderer 212A-C has the ability to independently send the one or more clients 202 associated with the particular transaction or transactions a rejection message. In such embodiments, redundant rejection messages to be sent by multiple orderers may be discarded. Each rejection message can indicate to the one or more clients 202 associated with the particular transaction why that specific orderer 212A-C rejected that particular transaction. These embodiments allow the one or more clients 202 who have submitted a particular transaction to quickly receive notice that, that particular transaction might be rejected. In these embodiments, the one or more clients do not have to wait for all or a majority of the orderers 212A-C of group of orderers 210 to finish ordering transaction schedule 218 before receiving indicia that the particular transaction might fail or be rejected.

In some embodiments, a quorum or consensus of group of orderers 210 can compare the particular transaction or transactions of group of transactions 204 that each respective orderer 212A-C has rejected as part of rejected transaction set 222. If a quorum or consensus of group of orderers 210 agree that a particular transaction or transactions should be rejected, then, in some embodiments, ordering service 206 can send each of the one or more clients 202 associated with the particular transaction or transactions a single rejection message for the entire quorum of orderers 212A-C, providing the one or more clients 202 with evidence and/or a rationale as to why that particular transaction was rejected. While in some embodiments the quorum or consensus of orderers is the same consensus or predetermined portion of orderers 212A-C of group of orderers 210 regarding identifying consensus for transaction schedule 218, in other embodiments, the quorum or consensus required to send the rejection message to one or more clients 202 is different. For example, the quorum associated with the aforementioned particular transaction that is rejected can require less orderers 212A-C than are required for transaction schedule 218 consensus. In these embodiments, the one or more clients 202 can receive timely notice that a particular transaction has been rejected, while also being reasonably sure, due to the quorum of orderers 212A-C agreeing that the particular transaction will be rejected.

In embodiments, how a rejection message is sent to one or more clients 202 regarding a particular transaction being rejected as part of the rejected transaction set 222 can be regulated by ordering policy 213. For example, ordering policy 213 can dictate whether orderers 212A-C in ordering service 206 send individual rejection messages or whether a quorum confirms the particular transaction is rejected and the ordering service 206 sends a single message. Ordering policy 213 can also determine what the quorum should be implemented in specific situations. In some embodiments, one or more clients 202 may be able to request how and when they receive a rejection message regarding a particular transaction that is rejected.

Turning now to a discussion on how group of transactions 204 can be ordered at ordering service 206 to determine transaction schedule 218. Embodiments disclosed herein refer to specific sorting and ordering techniques, but any technique capable of producing a transaction schedule 218 that minimizes concurrency control issues while maintaining trust in the blockchain network, (e.g., blockchain network 200) can be used. Embodiments disclosed herein provide methods of determining transaction schedule 218.

In embodiments, transaction schedule 218 can include at least a set of ordered transactions in conflict-free transaction set 220, at least a rejected transaction set 222, or a combination thereof. Conflict-free transaction set 220 can include any number of transactions arranged in a particular order that, if committed by peers to the blockchain in that particular order, will not produce any concurrent state issue or violations. Rejected transaction set 222 can include any number of transactions and can include transactions that are rejected from group of transactions 204 for one or more reasons (e.g., verification, invalid, removed, etc.). In many embodiments, transactions are rejected from group of transactions 204 and conflict-free transaction set 220 in an effort to maximize the number of valid transaction in the conflict-free transaction set 220 while minimizing the number of rejected transaction set 222. In these embodiments, if group of transactions 204 did not order/reorder transactions and/or remove rejected transactions, some of which may already be invalid, then it is possible the majority of client submitted transactions (e.g., group of transactions 204) would be invalidated and the while the invalidated transactions would be committed to the blockchain, the invalid transactions would not be allowed to update the current state of the ledger.

In embodiments, ordering service 206 can be configured to verify group of transactions 204. While in many embodiments ordering service 206 can verify each transaction in group of transactions 204, in other embodiments, less than all of the transactions included in group of transactions 204 are verified. Verifying group of transactions 204 at ordering service 206 can include, but is not limited to, verifying that transactions have the correct signatures, and verifying that the transaction have the correct endorsement (e.g., each transaction has satisfied the endorsement policy). If ordering service 206 is unable to verify one or more transactions from group of transactions 204, the one or more transactions can be identified as failed transactions.

In embodiments, a failed transaction (or transactions) can be returned to the client of where the failed transaction originated from (e.g., from one or more clients 202). In these embodiments, ordering service 206 can provide the client of each failed transaction with evidence or a rationale regarding why the transaction was identified as a failed transaction. In some embodiments, after the failed transaction sent back to the client it originated from, the failed transaction can be deleted from group of transactions 204. In these embodiments, the failed transaction is removed from potential ordering in transaction schedule 218. In this embodiment, the failed transaction will not be recorded or committed to the blockchain.

Because failed transactions are often fatally flawed, such transactions cannot be valid. Removing failed transactions from transaction schedule 218, aids in reducing potential ordering mistakes within group of transactions 204, reduces wasted dead storage space associated committing invalid/failed transactions to the blockchain, and can result in enhance performance of the blockchain by reducing the number of transactions that need processing. While removing the failed transaction from consideration in transaction schedule 218 has a variety of benefits, in other embodiments, ordering policy 213 can dictate that the failed transaction should be recorded in the blockchain. As such, in some embodiments, the one or more failed transactions can be rejected from group of transactions 204 and included in rejected transaction set 222 as part of transaction schedule 218.

In embodiments, ordering service 206 can include a skeleton-key database 214. Skeleton-key database 214 can be configured to maintain an archive of keys, that includes all of the keys used and included in the state database, and an archive of versions associated with the archive of keys (keys, versions). Skeleton-key database 214 reflects the (key, version) state of valid transaction blocks (e.g., ordered block 224) that have been broadcast to peers 208 from ordering service 206. As discussed herein, while ordering service 206 ensures each peer 208 and endorsing peer receives blocks in the same order, the blocks may not be committed at the same time to each peer 208 or endorsing peer. As such, it is possible that group of transactions 204 may include one or more transactions that are no longer valid because of the latency between when the time group of transactions 204 was endorsed by an endorser peer and when group of transactions 204 arrived at ordering service 206, a different valid transaction could be committed to the blockchain, resulting in the current state being updated. In other words, skeleton-key database 214 maintains a (key, version) state that would reflect the state database maintained by each peer 208 if each peer were to receive each block at the same time.

In embodiments, skeleton-key database 214 can be used to identify transactions in group of transactions 204 that are invalid transactions (e.g., stale transactions). Invalid transactions, or stale transactions, are transactions that have at least one read-set component (e.g., read-sets are formatted (key, version)) that requires a key version that is out of date and no longer exists in the current state. In embodiments, because skeleton-key database 214 includes (keys, versions) of all "to be" committed valid transaction blocks, the read-sets and write-sets of each transaction of group of transactions 204 can be compared to the skeleton-key database 214 (keys, versions). If one or more transactions among group of transactions 204 has a read-set key associated with a version number that no longer exists when compared to skeleton-key database 214, a concurrent state issue occurs, and the transaction is an invalid transaction.

In embodiments, invalid transactions are rejected from group of transactions 204 and are included in rejected transaction set 222. In some embodiments, each orderer 212A-C has a local copy of skeleton-key database 214 in which each orderer 212A-C compares the read-sets of each transaction group of transactions 204 to skeleton-key database 214 to determine and identify invalid transactions. Skeleton-key database 214 is updated when conflict-free transaction set 220 of transaction schedule 218 is confirmed by ordering service 206 (e.g., by a predetermined portion of orderers 212A-C among group of orderers 210 agreeing on the transaction schedule 218).

In embodiments, ordering service 206 can identify a precedence order within group of transactions 204 based, at least in part, on the read-set and write-set of each transaction of group of transactions 204. A precedence order can indicate if and how transactions received at ordering service 206 are related to one another (e.g., if transactions are dependent on each other or are independent as identified by data in each transactions' read-set and/or write-set). A precedence order can be determined based, at least in part, on using directed acyclic graphing principles, such as a precedence graph. Identifying a precedence order among the transactions can indicate: (i) that none of the transactions considered at ordering service 206 are related and each transaction's validity is independent of the other transactions in group of transactions 216; (ii) all of the transactions are related and can be linked in a precedence graph; (iii) less than all of the transactions are related where some of the transactions can be linked in a precedence graph while other transactions are independent and their validity is not dependent on the other transactions; and (iv) that some or all of the transactions are invalid. A precedence order can be used to order group of transactions 204 into transaction schedule 218 to form a conflict-free transaction set 220. Ordering conflict-free transaction set 220 using a precedence order can minimize the number of concurrency control issues that can result within a block of transactions.

FIG. 3 provides a simplified block diagram 300 demonstrating how group of transactions 216 (e.g., $T_A$ $T_B$, $T_C$, and $T_D$) can be ordered at ordering service 206, in accordance with at least one embodiment of the present disclosure. While in some embodiments block diagram 300 can be configured as ordering service 206, in other embodiments, block diagram 300 can be representative of one or more individual orderers 212A-C of group of orderers 210. Ordering service 206 can receive a group of transactions 204 that can arrive in any order.

Continuing the example in FIG. 3, received set of transaction 302 can include group of transactions 204 (e.g., $T_A$ $T_B$, $T_C$, and $T_D$) received by ordering service 206 from one or more clients 202. While only four transactions are depicted in FIG. 3, any number of transactions may be ordered as dictated by the blockchain network. Received set of transactions 302 can reflect the order in which each transaction, $T_A$ $T_B$, $T_C$, and $T_D$ arrived at ordering service 204.

In some traditional ordering services, transactions were often ordered in the same order each transaction arrived at the ordering service in. In many blockchain networks, once the transaction order is established, the ordering service cuts a block with that transaction order and the transactions cannot be reordered. In these traditional ordering services, the ordering service would then broadcast the block to the peers where each transaction is validated and committed to the blockchain based on the transaction order established in the block (e.g., the order of received set of transactions 302). Using this traditional method of ordering, if the transaction order shown in received transactions 302 were cut into a block and broadcast to the peers, during the validation commit phase, peers would first consider $T_A$. Peers would likely determine that $T_A$ is valid, but when attempting to validate transactions $T_B$, $T_C$, and $T_D$ (in that order) would find that each remaining transactions is invalid, based at least in part on concurrency control violations (e.g., MVCC violations).

While a transaction might be identified as invalid for a variety of reasons, in order for a transaction to be considered valid a transaction's version (e.g., "ver" in FIG. 3) for each key (e.g., "k" in FIG. 3) in the transaction's read-set should match the version for the same key in the current state. For example, if the ordering service were to send a block of transaction ordered as shown in received set of transactions 302 (e.g., ordered $T_A$, $T_B$, $T_C$, $T_D$), $T_A$, having a read-set ($k_1$, $ver_1$) and a write-set ($k_2$, val, $ver_1$ $ver_2$), is the first transaction that will be validated by each peer upon receiving the block from the ordering service. Because there is no conflict between the read-set version and the current state, $T_A$ is considered valid. As a result, once transaction $T_A$ is committed by the peer to the blockchain, the value (e.g., "val" in FIG. 3) associated with $k_2$ in the write-set will be reflected in the ledger and the version associated with $k_2$ will be incremented from $ver_1$ to $ver_2$.

Continuing the above example regarding received set of transactions 302, if $T_B$ is ordered to come after $T_A$, then $T_B$ will be determined to be invalid. As shown in the received set of transactions 302 listed in FIG. 3, $T_B$ has a read-set ($k_2$, $ver_1$), ($k_3$, $ver_1$) and a write-set ($k_3$, val, $ver_1$ $ver_2$). Because the first transaction, transaction $T_A$, has already or will update the current state of the blockchain to ($k_2$, val, $ver_2$), when the peer(s) attempt to validate $T_B$ the peer will determine that ($k_2$, $ver_1$) of $T_B$'s read-set ($k_2$, $ver_1$), ($k_3$, $ver_1$) does not match the $ver_2$ of current state associated with key $k_2$. As a result, transaction $T_B$, sometimes referred to as a stale transaction, is determined to be invalid due to a concurrency control issue (e.g., MVCC violation). In addition, since transactions $T_C$ and $T_D$ are also ordered after $T_A$ and include ($k_2$, yen) as a component of their respective read-sets, $T_C$ and $T_D$ are also invalid for at least the same reasons. As a result, only valid transaction $T_A$ would be allowed to update the current state (e.g., ($k_2$, val, $ver_1$) ($k_2$, val, $ver_2$)) associated with the key $k_2$. While, transactions $T_B$, $T_C$, and $T_D$ would be recorded in the block, their respective write-sets would not be reflected in the current state. Embodiments disclosed herein relate generally to decreasing the amount of concurrency control issues that can arise through the traditional transaction flow by changing the order of the transactions at ordering service 206.

In embodiments, once ordering service 206 receives group of transactions 204, ordering service 206 can order group of transactions 204 based, at least in part, on each transactions' read-set and write-set to determine a precedence order. Ordering the transactions to form transaction schedule 218 allows ordering service 206 to minimize concurrency control based issues and allow more valid transactions to be committed to the blockchain. In embodiments, ordering service 206 can inspect the read-set and write-set of each transaction and determine a transaction schedule for group of transactions 204. In these embodiments, transaction schedule 218 can include, conflict-free transaction set 220, rejected transaction set 222, or a combination thereof. In embodiments, conflict-free transactions set 220 include group of transactions ordered based on a precedence order. As discussed herein, precedence order can indicate if and how transactions received at ordering service 206 are related to one another. A precedence order can be determined based, at least in part, on using directed acyclic graphing principles, such as a precedence graph.

For example, in FIG. 3 ordering service 204 (not shown) can receive received set of transactions 302 (e.g., group of transactions 216), from one or more clients 202, in the order of $T_A$, $T_B$, $T_C$, $T_D$. Ordering service 204 can then review the read-set and write-set of transactions $T_A$, $T_B$, $T_C$, $T_D$ to identify a precedence order. Using the received set of transaction 302 in FIG. 3, the precedence order can indicate that each $T_B$, $T_C$, and $T_D$ are related to $T_A$ where each transaction $T_B$, $T_C$, and $T_D$ includes a read-set component that would be impacted by $T_A$'s write-set. The precedence order can also take into consideration multiple dependencies, such as $T_D$ being related to $T_C$ where $T_D$ includes a read-set component that would be impacted by $T_C$'s write-set.

Continuing this example, ordering service 204 can use this precedence order to create a transaction schedule (e.g., ordered set of transactions 304, ordered $T_D$ $T_B$, $T_C$, $T_A$,). Once a transaction schedule is determined ordering service 204 can order the transactions and then cut/broadcast the block to the peers 208. Because $T_A$, whose write-set impacts the read-sets of $T_B$, $T_C$, and $T_D$, is last, and $T_C$, whose write-set impacts the read-set of $T_D$, is ordered second to last, there are no concurrency control issues within the block containing the ordered set of transaction 304 and the transaction schedule has a conflict-free schedule within the block. As such, if there are no other concurrency control issues among previously committed blocks and the block containing the transaction schedule $T_D$ $T_B$, $T_C$, and $T_A$ (e.g., as shown in ordered set of transactions 304) each transaction will likely be considered valid, at least in regard to concurrency control issues. While the transaction schedule provided in ordered set of transactions 304 demonstrates a simple and neatly ordered transaction set, in some embodiments, transactions are not as simply ordered.

In embodiments, ordering service 206 can determine a precedence order using a variety of methods to determine a conflict-free transaction set 220 (e.g., part of transaction schedule 218) for group of transactions 204. While the example depicted in FIG. 3 demonstrates a simple transaction schedule 218 and/or conflict free transaction set 220 using a precedence order based on each of the read-set and write-sets of the transactions, in many situations the precedence order of the transactions can be more complicated with multiple dependencies or cycles possibly occurring between various transactions in group of transactions 204. As such, in various embodiments, topological sorting and other mathematical ordering principles (e.g., feedback vertex sorting method) can be used to configure the precedence order into conflict-free transaction set 220 of transaction schedule 218.

Figure 4A:
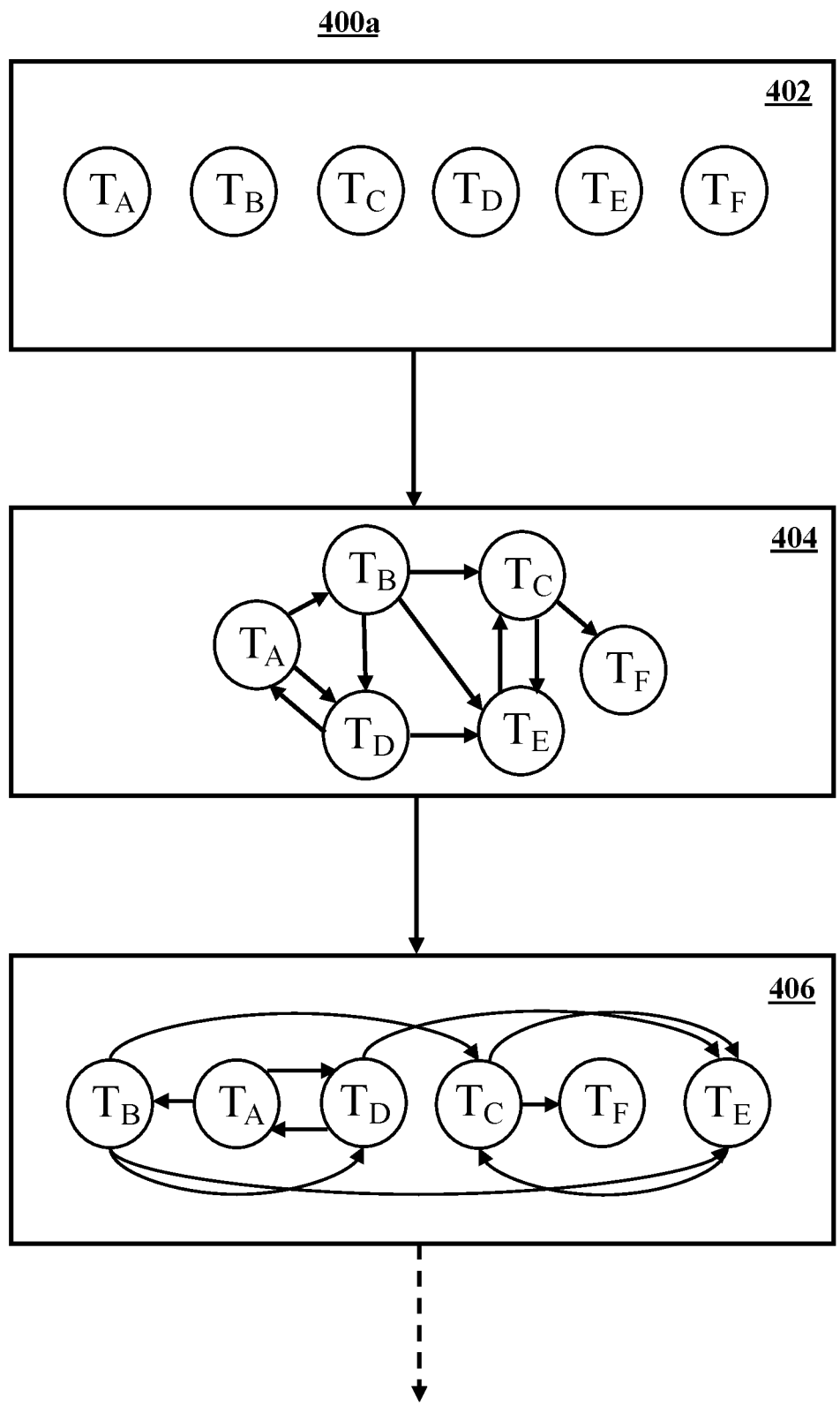
FIG. 4A depicts a first portion of a block diagram depicting an example of ordering transactions from a precedence order that cannot be sorted using DAG principles, in accordance with embodiments of the present disclosure.
Figure 4B:
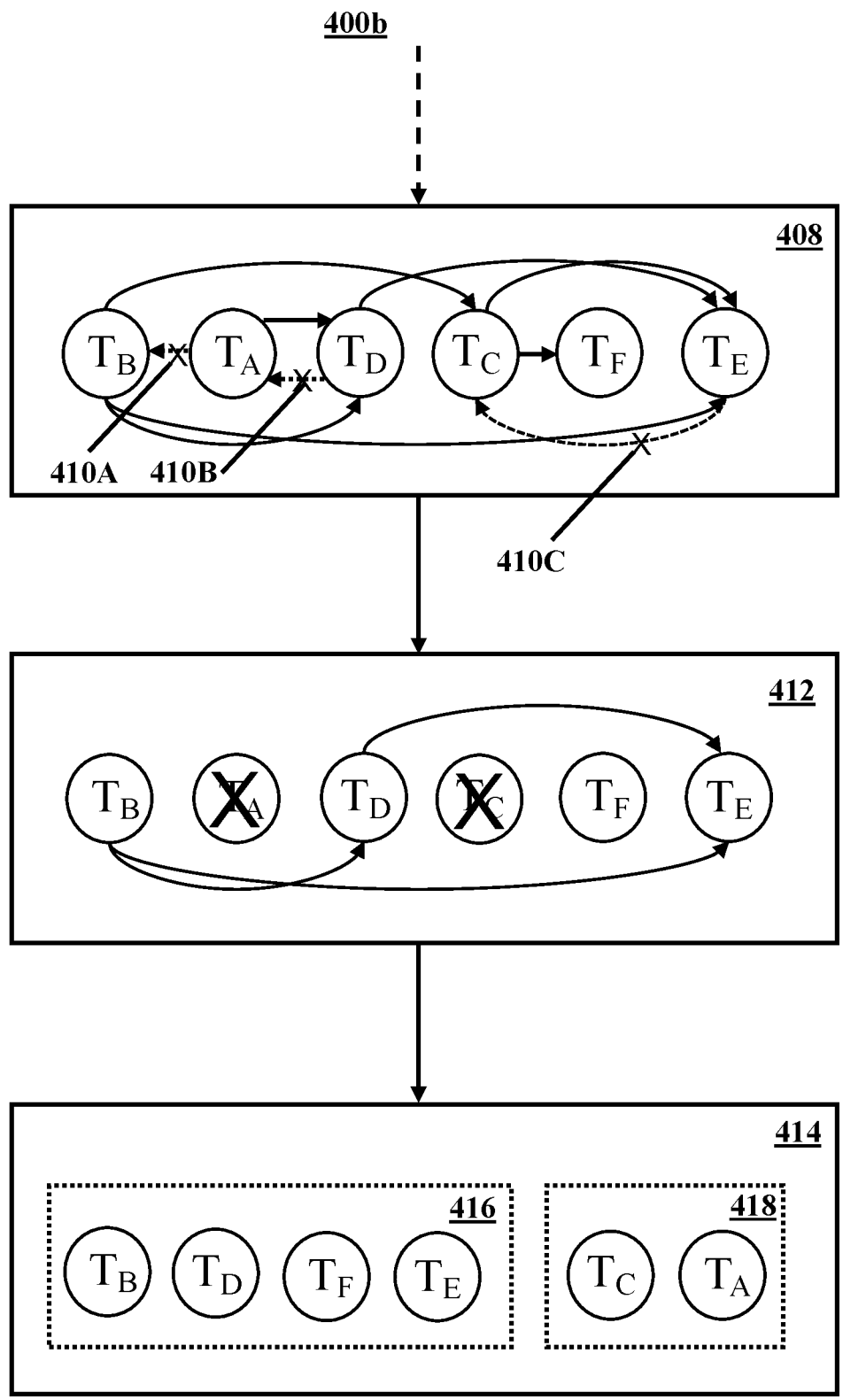
FIG. 4B depicts a second portion of a block diagram depicting an example of ordering transactions from a precedence order that cannot be sorted using DAG principles, in accordance with embodiments of the present disclosure.

While in some embodiments, a precedence order can be easily determined using sorting methods associated with directed acyclic graphing (DAG) principles (e.g., see FIG. 3), in other embodiments having complex interrelated transactions, DAG principles cannot always be directly applied (e.g., see FIGS. 4A and 4B). As a result, in some embodiments, not all groups of transactions 204 can be neatly ordered like those referenced in FIG. 3 (e.g., ordered set of transactions 304) and elections regarding how precedence order will influence transaction schedule 218 must often be made. Such elections can sometimes result in one or more transactions being invalidated in order to create transaction schedule 218 that has a conflict-free transaction set 220. In these embodiments, ordering service 206 can determine from the precedency order what transactions, if removed (e.g., invalidated by ordering service 206), would result in the smallest number of transactions having to be removed in order to produce a transaction schedule having a conflict-free transaction set 220. Transactions removed from group of transactions 204 during reordering as a result of making a precedence order election to form a conflict-free transaction set 220 can be referred to as removed transactions. While in some embodiments the transaction schedule includes only the conflict-free transaction set 220 (e.g., See FIG. 3), in other embodiments transaction schedule 218 also includes rejected transaction set 222.

As discussed herein, rejected transaction set 222 can be any number of transactions that have been rejected during ordering at ordering service 206. Rejected transaction set 222 can include removed transaction, invalid transactions and/or failed transactions. In embodiments where some order among rejected transaction set 222 is desired, such embodiments can include the rejected transactions of rejected transaction set 22 to be ordered or arranged based on each rejected transaction's rejection category (e.g., removed transaction, invalid transaction, or failed transaction). In some embodiments, rejected transaction set 222 can be further ordered among the rejection categories using other methods of ordering such as ordering service 206 arrival order.

FIG. 4A depicts a simplified block diagram 400a demonstrating example embodiments of determining a transaction schedule, in accordance with at least one embodiment of the present disclosure. More particularly, block diagram 400 depicts embodiments regarding how ordering service 206 can determine transaction schedule 218 from a precedence order of transactions, such as group of transactions 204 when a conflict-free transaction set 222 is not directly indicated using sorting principles, such as DAG sorting. While FIG. 4A often refers to one possible method of electing a transaction schedule from a precedence order, any other method of sorting, capable of developing conflict-free transaction set 220 while minimizing the number of invalidated or rejected transactions, can be used. In addition, while FIG. 4A depicts only six transactions, similar embodiments can be applied to any number of transactions.

In embodiments, ordering service 206 can receive a set of initial transactions 400 (e.g., group of transactions 204), $T_A$ $T_B$, $T_C$, $T_D$ $T_E$, and $T_F$, that can arrive at ordering service 206 in the order indicated in block 402 (e.g., ordered $T_A$ $T_B$, $T_C$, $T_D$ $T_E$, and $T_F$). While similar transaction nomenclature is used in FIGS. 4A and 4B as is used in FIG. 3, the transactions referenced in FIGS. 4A and 4B may or may not be the same and the specific read-sets and write-sets used in FIG. 3 may or may not be carried over to the transactions discussed in FIGS. 4A and 4B. In embodiments, a precedence graph 404 can be used to determine a precedence order using the read-set and write-set of each transaction in set of initial transactions 400. Precedence order 404, as shown, cannot be directly sorted using traditional DAG principals because many of the transactions are related and have conflicting or co-pending read-sets and write-sets that create precedence cycles.

As such, in some embodiments an initial method of electing conflict-free transaction set 220 by pruning or removing one or more transactions (e.g., rejected transaction set 222) can be used. This initial method of electing a set of conflict-free transaction aims to minimize the number of transactions that are removed while also maximizing the number of transactions in conflict-free transaction set 220. In some embodiments, the initial method in determining a set of conflict-free transactions and what transaction or transactions will be removed can be a lightweight heuristic approximation algorithm. While the initial method can be any approximation algorithm, algorithms utilizing polynomial time and those not conditioned on solving large dynamic programing problems, that can impact time sensitive block cutting operations, are preferred.

One possible lightweight heuristic approximation algorithm that can be used as an initial method is the feedback vertex sorting method. Feedback vertex sorting method allows for a graph having one or more cycles (e.g., multiple precedencies among transaction) to produce a feedback vertex set by removing one or more vertices (e.g., transactions). A feedback vertex set is a graph depicting a subset of vertices that no longer has cycles after removing particular other vertices associated with the cycles. An example demonstrating how ordering service 206 can use principles associated with feedback vertex sorting method to elect an order and remove transactions to determine conflict-free transaction set 220 can be viewed in FIG. 4. In this example, ordering service 206 can identify a precedence order using precedence graph 404. Once a precedence order has been determined, each transactions can be sorted into a sufficient order 406. As discussed herein, because of the multiple-dependency associated with group of transactions 204 received at ordering service 206, in some embodiments, conflict-free transaction set 220 cannot always be completely ordered without making elections as to the pendency order and removing one or more transactions (e.g., removed transactions). As a result, a sufficient or heuristic order can be used.

In embodiments, a sufficient order can be determined by associating each transaction with its precedence order, demonstrated in FIG. 4A with directional arrows. In some embodiments, the directional arrows depicted in precedence order (e.g., precedence graph 404) can be understood to be an edge imbalance. Edge imbalances can refer to the fact that the precedence or dependency between each transaction is not uniform. In some embodiments, sufficient order 406 can be determined by associating each transaction (or vertex) with its precedence (e.g., in-directional arrows minus out-directional arrows).

Continuing the example in FIG. 4B, the vertex cover problem can be used to greedily remove (e.g., as defined by the heuristic algorithms) the transactions that have backward edges (e.g., block diagram 408 depicting sufficient ordered transaction and removing backward edges 410A-C, or those arrows pointing to the left). In some embodiments, greedy removal begins by finding the transaction that has the largest number of edges pointing backwards and removing the transaction and all the edges incident to it, and then repeating the process until there are no more edges pointing backwards. The resulting graph 412 depicts a simple DAG transaction order once the backward edges 410 have been removed. An example transaction schedule 414 can be determined from the DAG from resulting graph 412. Transaction schedule 414 can have conflict-free transaction set 416 (e.g., ordered $T_B$ $T_D$, $T_F$, and $T_E$) and rejected transaction set 418 (e.g., rejected transactions $T_A$ and $T_C$) were elected to be removed and are rejected as removed transactions.

Figure 5:
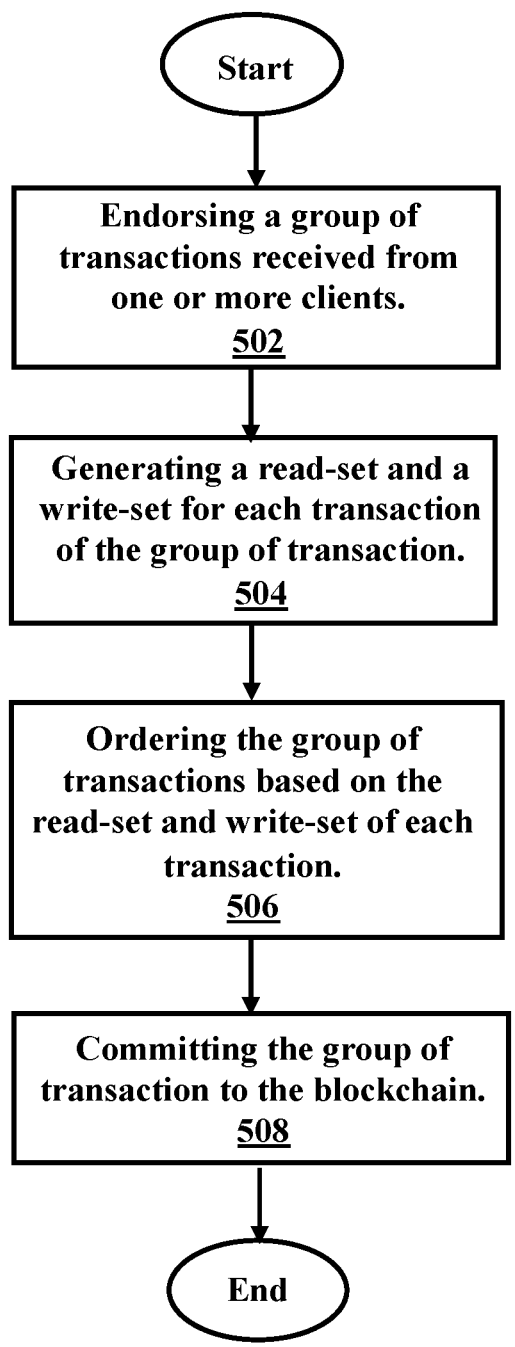
FIG. 5 illustrates a flowchart of an example method for ordering transactions at an ordering service, in accordance with embodiments of the present disclosure.

Referring now to FIG. 5, a flowchart illustrating an example method 500 for ordering transactions at an ordering service, in accordance with embodiments of the present disclosure. In some embodiments, the method 500 may be performed by an ordering service (e.g., ordering service 206) with/in a blockchain network/Hyperledger fabric.

In some embodiments, the method 500 begins at operation 502 where the processor endorses a group of transactions received from one or more clients. The method 500 proceeds to operation 504 where the processor generates a read-set and a write-set for each transaction of the group of transactions. The method 500 proceeds to operation 506 where the processor orders the group of transactions, based on the read-set and the write-set of each transaction. The method 500 proceeds to operation 508 where the processor commits the group of transactions to the blockchain. In some embodiments, as depicted, after operation 508, the method 500 may end.

Figure 6:
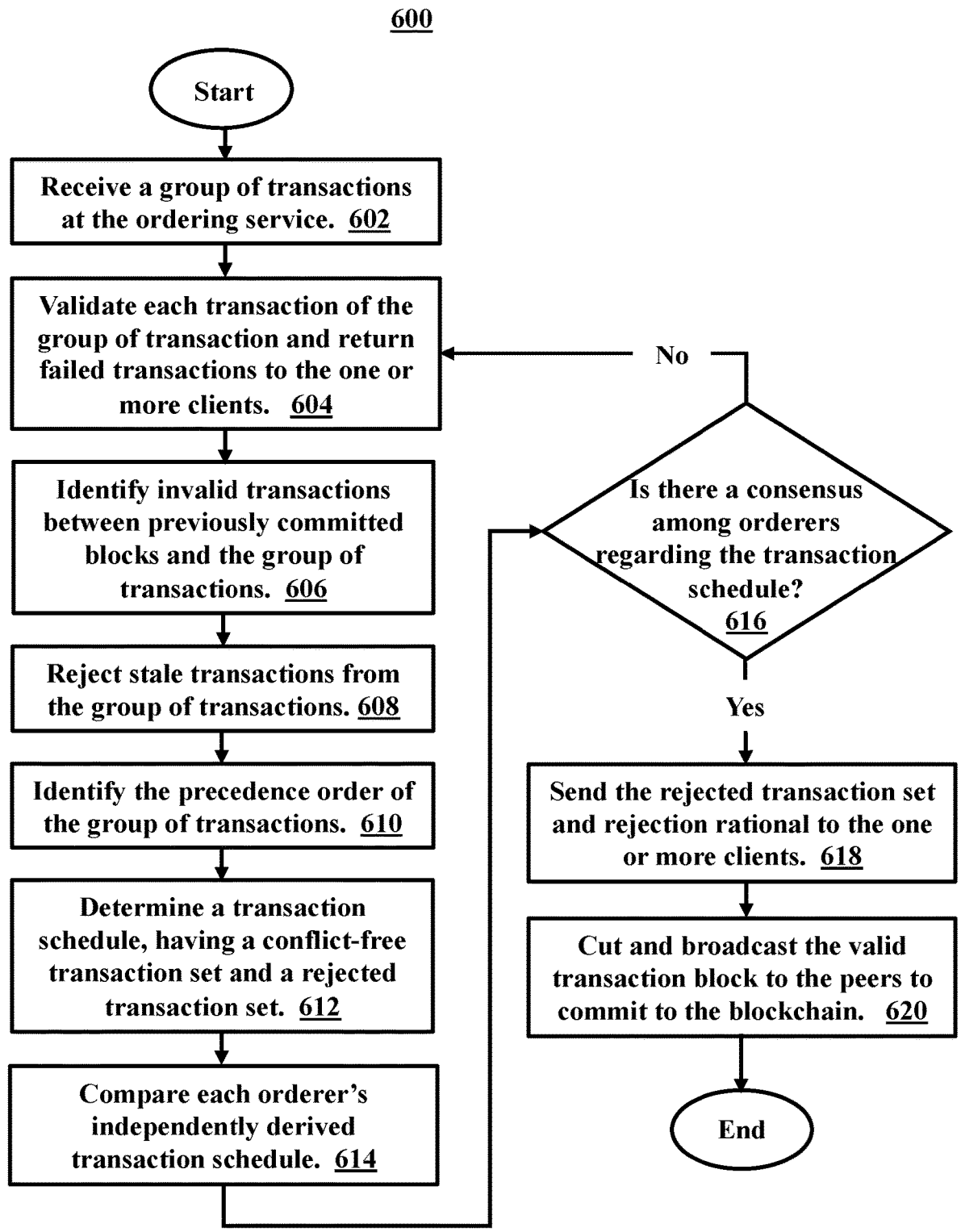
FIG. 6 illustrates a flowchart of an example method for ordering transactions at an ordering service, in accordance with embodiments of the present disclosure.

Referring now to FIG. 6, a flowchart illustrating an example method 600 for ordering transactions at an ordering service, in accordance with embodiments of the present disclosure. In some embodiments, the method 600 may be performed by an ordering service (e.g., ordering service 206) with/in a blockchain network/Hyperledger Fabric.

In some embodiments, the method 600 begins at operation 602 where the processor receives a group of transactions at the ordering service. The method 600 proceeds to operation 604 where the processor validates each transaction of the group of transactions and returns failed transactions to the one or more clients. The method 600 proceeds to operation 606 where the processor identifies invalid transactions between previously committed blocks and the group of transactions. The method 600 proceeds to operation 608 where the processor rejects invalid transactions from the group of transactions. The method 600 proceeds to operation 610 were the processor identifies the precedence order of the group of transactions. The method 600 proceeds to operation 612 where the processor determines a transaction schedule, having a conflict-free transaction set and a rejected transaction set. The method 600 proceeds to operation 614 where the processor compares each orderers independently derived transaction schedule.

The method 600 proceeds to operation 616 where processor determines if there is a consensus among orderers regarding the transaction schedule. If the processor determines there is not a consensus among the orderers, method 600 proceeds to operation 604 where the processor begins to reconfigure the transactions schedule by repeating at least a portion of method 600. If the processor determines there is a consensus among the orderers, method 600 proceeds to operation 618, where the processor sends the rejected transaction set and rejection rational to the one or more clients. The method 600 proceeds to operation 620 where the processor cuts and broadcasts the valid transaction block to the peers to commit to the blockchain. In some embodiments, as depicted, after operation 620, the method 600 may end.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7A:
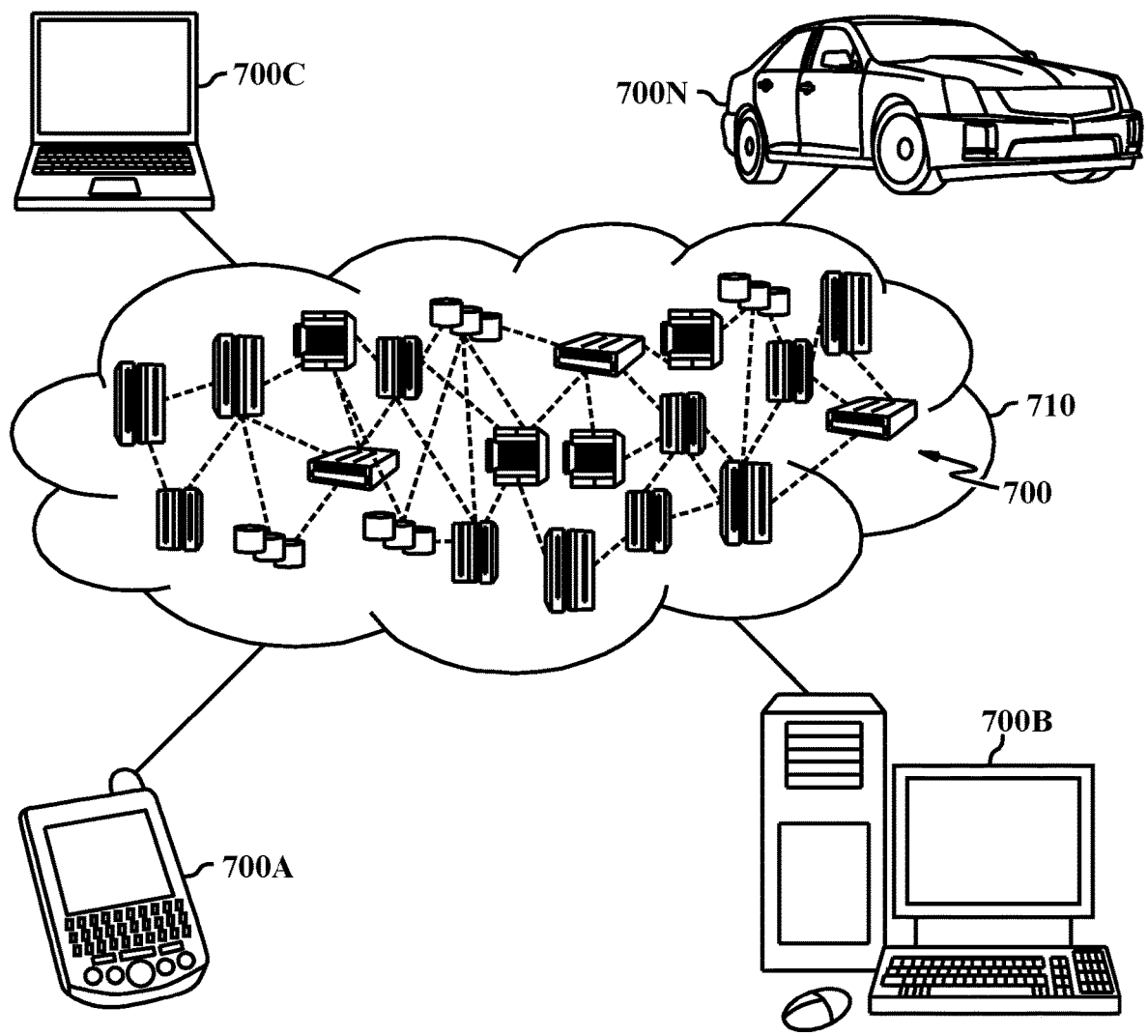
FIG. 7A illustrates a cloud computing environment, in accordance with embodiments of the present disclosure.

FIG. 7A, illustrated is a cloud computing environment 710 is depicted. As shown, cloud computing environment 710 includes one or more cloud computing nodes 700 with which local computing devices used by cloud consumers, such as, for example, personal digital assistant (PDA) or cellular telephone 700A, desktop computer 700B, laptop computer 700C, and/or automobile computer system 700N may communicate. Nodes 700 may communicate with one another. They may be grouped (not shown) physically or virtually, in one or more networks, such as Private, Community, Public, or Hybrid clouds as described hereinabove, or a combination thereof.

This allows cloud computing environment 710 to offer infrastructure, platforms and/or software as services for which a cloud consumer does not need to maintain resources on a local computing device. It is understood that the types of computing devices 700A-N shown in FIG. 7A are intended to be illustrative only and that computing nodes 700 and cloud computing environment 710 can communicate with any type of computerized device over any type of network and/or network addressable connection (e.g., using a web browser).

Figure 7B:
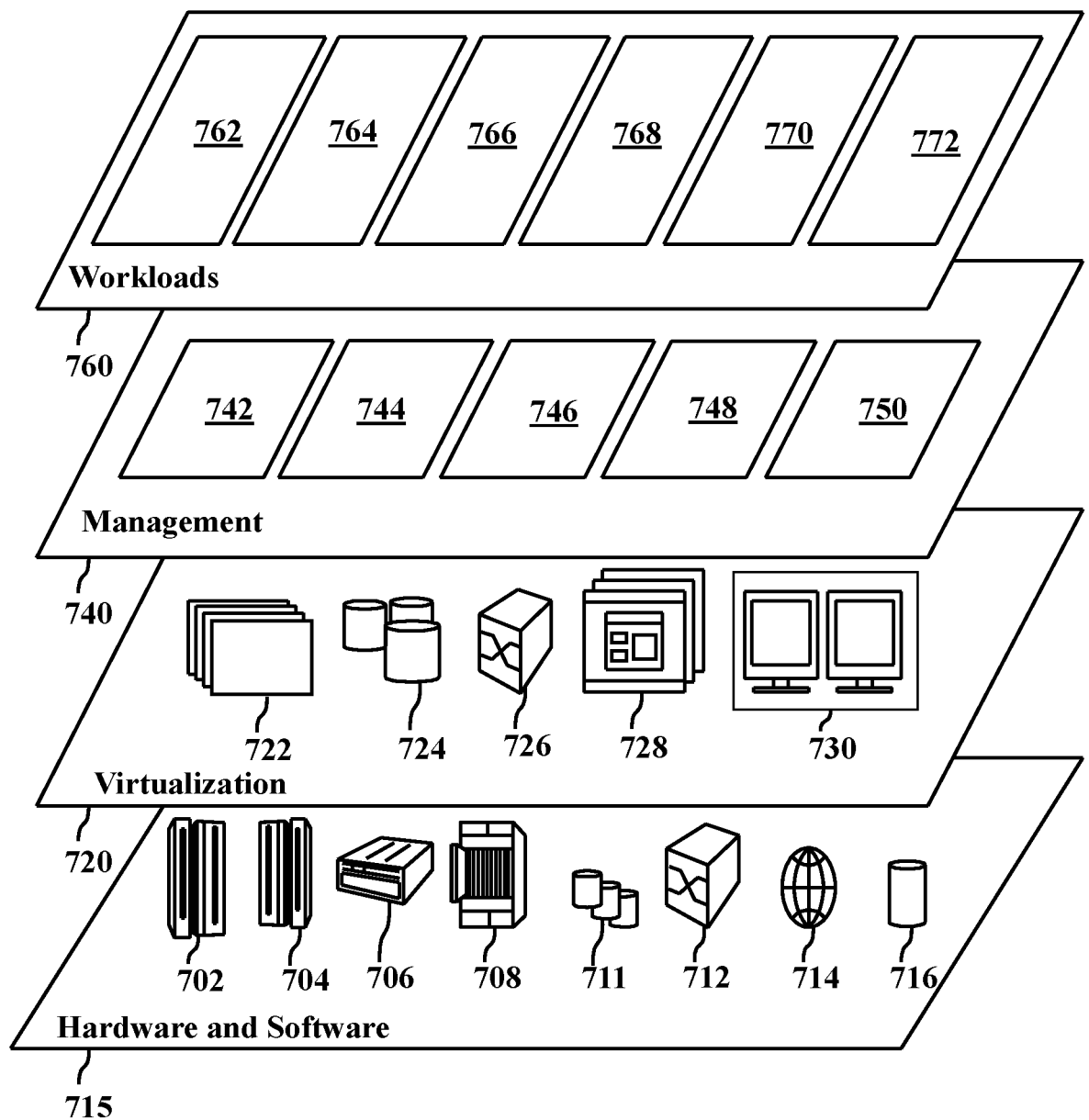
FIG. 7B illustrates abstraction model layers, in accordance with embodiments of the present disclosure.

FIG. 7B, illustrated is a set of functional abstraction layers provided by cloud computing environment 710 (FIG. 7A) is shown. It should be understood in advance that the components, layers, and functions shown in FIG. 7B are intended to be illustrative only and embodiments of the disclosure are not limited thereto. As depicted below, the following layers and corresponding functions are provided.

Hardware and software layer 715 includes hardware and software components. Examples of hardware components include: mainframes 702; RISC (Reduced Instruction Set Computer) architecture based servers 704; servers 706; blade servers 708; storage devices 711; and networks and networking components 712. In some embodiments, software components include network application server software 714 and database software 716.

Virtualization layer 720 provides an abstraction layer from which the following examples of virtual entities may be provided: virtual servers 722; virtual storage 724; virtual networks 726, including virtual private networks; virtual applications and operating systems 728; and virtual clients 730.

In one example, management layer 740 may provide the functions described below. Resource provisioning 742 provides dynamic procurement of computing resources and other resources that are utilized to perform tasks within the cloud computing environment. Metering and Pricing 744 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 746 provides access to the cloud computing environment for consumers and system administrators. Service level management 748 provides cloud computing resource allocation and management such that required service levels are met. Service Level Agreement (SLA) planning and fulfillment 750 provide pre-arrangement for, and procurement of, cloud computing resources for which a future requirement is anticipated in accordance with an SLA.

Workloads layer 760 provides examples of functionality for which the cloud computing environment may be utilized. Examples of workloads and functions which may be provided from this layer include: mapping and navigation 762; software development and lifecycle management 764; virtual classroom education delivery 766; data analytics processing 768; transaction processing 770; and transaction ordering 772.

Figure 8:
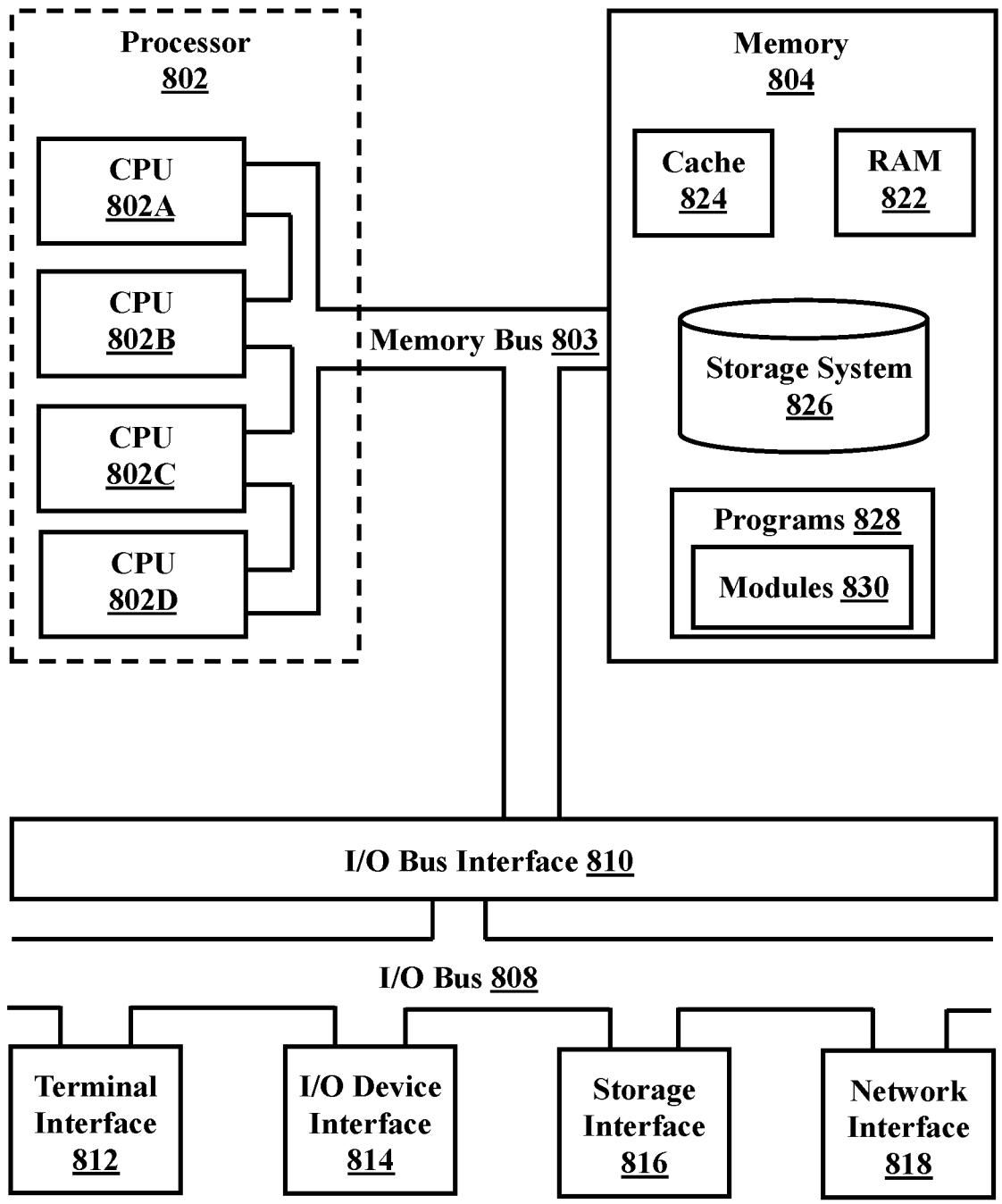
FIG. 8 illustrates a high-level block diagram of an example computer system that may be used in implementing one or more of the methods, tools, and modules, and any related functions, described herein, in accordance with embodiments of the present disclosure.

FIG. 8, illustrated is a high-level block diagram of an example computer system 801 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 801 may comprise one or more CPUs 802, a memory subsystem 804, a terminal interface 812, a storage interface 816, an I/O (Input/Output) device interface 814, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may include one or more levels of on-board cache.

System memory 804 may include computer system readable media in the form of volatile memory, such as random access memory (RAM) 822 or cache memory 824. Computer system 801 may further include other removable/non-removable, volatile/non-volatile computer system storage media. By way of example only, storage system 826 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

One or more programs/utilities 828, each having at least one set of program modules 830 may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 828 and/or program modules 830 generally perform the functions or methodologies of various embodiments.

Although the memory bus 803 is shown in FIG. 8 as a single bus structure providing a direct communication path among the CPUs 802, the memory subsystem 804, and the I/O bus interface 810, the memory bus 803 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smartphone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for ordering a group of transactions on a blockchain, the method comprising:
    endorsing, by a processor, the group of transactions received from one or more clients;
    generating a read-set and a write-set for each transaction of the group of transactions;
    ordering the group of transactions at an ordering service, wherein the ordering service utilizes a precedence graph to determine a precedence order using the read-set and write-set of each transaction, wherein the ordering service further includes a skeleton-key database configured to maintain an archive of keys and an archive of versions associated with the archive of keys, wherein the skeleton-key database is separate from a world-state database associated with the blockchain, and wherein a transaction schedule is based on the skeleton-key database and the read-set and write-set of each transaction of the group of transactions;
    determining a sufficient order by associating each transaction with its precedence order using one or more directional arrows in the precedence graph, wherein the one or more directional arrows each depict an edge imbalance between each transaction;
    removing one or more transactions with a backward edge using a vertex cover problem by repeatedly finding the one or more transactions with a largest number of edges pointing backwards and continuously removing a corresponding transaction and all edges incident to the corresponding transaction until there are no remaining edges pointing backwards;
    identifying a conflict-free transaction set and a rejected transaction set from the group of transactions using the precedence graph in which all the backward edge are removed, wherein the ordered group of transactions minimizes the number of transactions removed by the rejected transaction set from the conflict-free transaction set; and
    commit the conflict-free transaction set and a list of the rejected transaction set to the blockchain.

2. The method of claim 1, wherein ordering the group of transactions at the ordering service comprises:
    verifying each transaction of the group of transactions, wherein verifying each transaction includes inspecting each transaction for at least one necessary component.

3. The method of claim 1, wherein ordering the group of transactions at the ordering service comprises:
    identifying a precedence order within the group of transactions based on the read-set and the write-set of each transaction.

4. The method of claim 3, wherein ordering the group of transactions at the ordering service further comprises:
    determining the transaction schedule from the precedence order, wherein the conflict free transaction set and the rejected transaction set are associated with the transaction schedule.

5. The method of claim 4, wherein each orderer of the group of orderers independently determines the transaction schedule from the precedence order.

6. The method of claim 5, wherein determining the transaction schedule further includes:
    analyzing each of the transaction schedules independently processed by each orderer of the group of orderers; and
    identifying whether a consensus on the transaction schedule has been reached.

7. The method of claim 6, wherein the consensus is a predetermined portion of orderers from the group of orderers agreeing on the conflict-free transaction set and the rejected transaction set.

8. The method of claim 4, further comprising:
    identifying a particular transaction is part of the rejected transaction set of the transaction schedule; and
    providing a rejection message to the one or more clients associated with the particular transaction.

9. The method of claim 8, wherein the rejection message includes a transaction identifier, a number of a reject transaction block where the rejected transaction set is recorded, and a hash of a new block.

10. The method of claim 8, wherein one or more orderers from the group of orderers, automatically send the one or more clients associated with the particular transaction the rejection message.

11. The method of claim 8, wherein a quorum of the group of orderers agree on rejecting the particular transaction as part of the rejected transaction set and the ordering service sends the one or more clients associated with the particular transaction the rejection message.

12. The method of claim 1, wherein the ordering service is configured to determine if any transaction of the group of transactions at the ordering service conflicts with a previously committed transaction based on the skeleton-key database and the read-set and the write-set of each transaction of the group of transactions.

13. The method of claim 1, wherein ordering the group of transactions at the ordering service further comprises:
    cutting a valid transaction block having a transaction schedule, wherein the transaction schedule includes a conflict-free transaction set and a rejected transaction set;
    broadcasting the valid transaction block to a group of peers;
    generating a reject transaction block, wherein the reject transaction block includes the rejected transaction set; and
    committing the reject transaction block to a reject chain in the ordering service.

14. The method of claim 13, further comprising:
    generating a Merkle-tree of the rejected transaction set;
    identifying a block number of the valid transaction block; and
    including the Merkle-tree of the rejected transaction set and the block number of the valid transaction block in the reject transaction block.

15. The method of claim 14, further comprises:
exposing an API to fetch the reject transaction block.

16. The method of claim 13, further comprising:
generating a Merkle-tree from the rejected transaction set of the transaction schedule;
organizing the Merkle-tree into a Merkle-root; and
including the Merkle-root in the transaction schedule of the valid transaction block.

17. A computer system for ordering a group of transactions on a blockchain, the computer system comprising:
one or more computer processors;
one or more computer readable storage media;
computer program instructions;
the computer program instructions being stored on the one or more computer readable storage media for execution by the one or more computer processors; and
the computer program instructions including instructions to:
endorse by a processor, the group of transactions received from one or more clients;
generate a read-set and a write-set for each transaction of the group of transactions;
order the group of transactions at an ordering service, wherein the ordering service utilizes a precedence graph to determine a precedence order using the read-set and write-set of each transaction, wherein the ordering service further includes a skeleton-key database configured to maintain an archive of keys and an archive of versions associated with the archive of keys, wherein the skeleton-key database is separate from a world-state database associated with the blockchain, and wherein a transaction schedule is based on the skeleton-key database and the read-set and write-set of each transaction of the group of transactions;
determine a sufficient order by associating each transaction with its precedence order using one or more directional arrows in the precedence graph, wherein the one or more directional arrows each depict an edge imbalance between each transaction;
remove one or more transactions with a backward edge using a vertex cover problem by repeatedly finding the one or more transactions with a largest number of edges pointing backwards and continuously removing a corresponding transaction and all edges incident to the corresponding transaction until there are no remaining edges pointing backwards;
identify a conflict-free transaction set and a rejected transaction set from the group of transactions using the precedence graph in which all the backward edge are removed, wherein the ordered group of transactions minimizes the number of transactions removed by the rejected transaction set from the conflict-free transaction set; and
commit the conflict-free transaction set and a list of the rejected transaction set to the blockchain.

18. The computer system of claim 17, the computer instructions further including instructions to:
cut a valid transaction block having a transaction schedule, wherein the transaction schedule includes a conflict-free transaction set and a rejected transaction set;
broadcast the valid transaction block to a group of peers;
generate a reject transaction block, wherein the reject transaction block includes the rejected transaction set; and
commit the reject transaction block to a reject chain in the ordering service.

19. A computer program product for ordering a group of transactions on a blockchain, the computer program product comprising one or more computer readable storage media and program instructions stored on the one or more computer readable storage media, the program instructions including instructions to:
endorse by a processor, the group of transactions received from one or more clients;
generate a read-set and a write-set for each transaction of the group of transactions;
order the group of transactions at an ordering service, wherein the ordering service utilizes a precedence graph to determine a precedence order using the read-set and write-set of each transaction, wherein the ordering service further includes a skeleton-key database configured to maintain an archive of keys and an archive of versions associated with the archive of keys, wherein the skeleton-key database is separate from a world-state database associated with the blockchain, and wherein a transaction schedule is based on the skeleton-key database and the read-set and write-set of each transaction of the group of transactions;
determine a sufficient order by associating each transaction with its precedence order using one or more directional arrows in the precedence graph, wherein the one or more directional arrows each depict an edge imbalance between each transaction;
remove one or more transactions with a backward edge using a vertex cover problem by repeatedly finding the one or more transactions with a largest number of edges pointing backwards and continuously removing a corresponding transaction and all edges incident to the corresponding transaction until there are no remaining edges pointing backwards;
identify a conflict-free transaction set and a rejected transaction set from the group of transactions using the precedence graph in which all the backward edge are removed, wherein the ordered group of transactions minimizes the number of transactions removed by the rejected transaction set from the conflict-free transaction set; and
commit the conflict-free transaction set and a list of the rejected transaction set to the blockchain.

20. The computer program product of claim 19, the program instructions further including instructions to:
cut a valid transaction block having a transaction schedule, wherein the transaction schedule includes a conflict-free transaction set and a rejected transaction set;
broadcast the valid transaction block to a group of peers;
generate a reject transaction block, wherein the reject transaction block includes the rejected transaction set; and
commit the reject transaction block to a reject chain in the ordering service.

* * * * *